United States Patent
Lawrence et al.

(10) Patent No.: US 12,499,287 B2
(45) Date of Patent: *Dec. 16, 2025

(54) PRODUCT DISPLAY DESIGN AND MANUFACTURING USING A PRODUCT DISPLAY DESIGN MODEL

(71) Applicant: THE HERSHEY COMPANY, Hershey, PA (US)

(72) Inventors: Eric Lawrence, Hershey, PA (US); Christopher P. Gantz, Hershey, PA (US); Gregory M. Gressel, Hershey, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/184,363

(22) Filed: Mar. 15, 2023

(65) Prior Publication Data
US 2023/0222254 A1   Jul. 13, 2023

Related U.S. Application Data

(63) Continuation of application No. 16/888,361, filed on May 29, 2020, now Pat. No. 11,714,926.

(51) Int. Cl.
*G06F 30/10*   (2020.01)
*A47F 5/10*   (2006.01)
(Continued)

(52) U.S. Cl.
CPC .............. *G06F 30/10* (2020.01); *G06F 30/12* (2020.01); *G06F 30/17* (2020.01); *G06T 19/20* (2013.01); *A47F 5/10* (2013.01); *G06F 2119/18* (2020.01)

(58) Field of Classification Search
CPC .......... G06F 30/10; G06F 30/12; G06F 30/17; G06F 2119/18; G06T 19/20; A47F 5/10
See application file for complete search history.

(56) References Cited

U.S. PATENT DOCUMENTS

| | | | |
|---|---|---|---|
| 6,068,139 A | 5/2000 | Brozak, Jr. | |
| 6,226,931 B1 * | 5/2001 | Haversat | E04B 2/7438 |
| | | | 52/71 |

(Continued)

FOREIGN PATENT DOCUMENTS

| | | |
|---|---|---|
| CN | 105129297 A | 12/2015 |
| CN | 108366679 A | 8/2018 |

(Continued)

OTHER PUBLICATIONS

Breugelmans et al.; "Effectiveness of In-Store Displays in a Virtual Store Environment"; Journal of Retailing 87 (1, 2011) 75-89 (Year: 2011).*

(Continued)

*Primary Examiner* — Rehana Perveen
*Assistant Examiner* — Nupur Debnath
(74) *Attorney, Agent, or Firm* — Shook Hardy & Bacon L.L.P.

(57) ABSTRACT

Product displays are used to hold and present products. A method of manufacturing a product display can include forming display unit and cartridge blanks for assembly into a product display that has been designed using a product display design model executed on a computing device. A dataset of standardized units is created and includes products, cartridges, and display units. The product display design model generates product display design options that specify geometric arrangements of cartridges within display units, where the cartridges are each associated with a product type. The geometric arrangements are based on inputs that include combinations of a target total product count, a (Continued)

target mix ratio, product types, and a product display type. Display unit blanks and cartridge blanks used to construct display units and cartridges of the product display are formed by a manufacturing device based on a generated product display design option.

20 Claims, 12 Drawing Sheets

(51) Int. Cl.
  *G06F 30/12* (2020.01)
  *G06F 30/17* (2020.01)
  *G06F 119/18* (2020.01)
  *G06T 19/20* (2011.01)

(56) References Cited

U.S. PATENT DOCUMENTS

| | | |
|---|---|---|
| 6,547,084 B2 | 4/2003 | Bauman et al. |
| 6,758,349 B1 | 7/2004 | Kwap et al. |
| 6,785,805 B1 | 8/2004 | House et al. |
| 6,959,284 B1 | 10/2005 | Howes |
| 6,964,235 B2 | 11/2005 | Hardy |
| 7,093,546 B2 | 8/2006 | Hardy |
| 8,091,715 B2 | 1/2012 | Roth |
| 8,118,164 B2 | 2/2012 | Brown |
| 8,170,367 B2 | 5/2012 | Moody et al. |
| 8,219,228 B2 | 7/2012 | Yuecel et al. |
| 8,525,849 B2 | 9/2013 | Nakamura et al. |
| 8,533,065 B2 | 9/2013 | Chow |
| 8,700,492 B1 | 4/2014 | Scott |
| 8,775,130 B2 | 7/2014 | Walker et al. |
| 8,783,553 B2 | 7/2014 | Hyman et al. |
| 8,807,356 B2 | 8/2014 | Weigand et al. |
| 8,820,481 B2 | 9/2014 | Brucia |
| 8,844,727 B2 | 9/2014 | Buhagiar |
| 8,875,872 B2 | 11/2014 | Bulls, Jr. |
| 8,930,235 B2 | 1/2015 | Mihic et al. |
| 9,075,492 B1 | 7/2015 | Scott et al. |
| 9,186,923 B2 | 11/2015 | Kim et al. |
| 9,194,117 B2 | 11/2015 | Hauptman et al. |
| 9,205,980 B2 | 12/2015 | Walter |
| 9,235,822 B2 | 1/2016 | Tian et al. |
| 9,345,354 B2 | 5/2016 | Nicolopulos et al. |
| 9,659,272 B2 | 5/2017 | Birch et al. |
| 9,703,179 B2 | 7/2017 | Bonner et al. |
| 9,714,145 B1 | 7/2017 | Lehmann |
| 9,805,333 B1 | 10/2017 | Bergstrom et al. |
| 9,839,304 B2 | 12/2017 | Liao et al. |
| 9,914,278 B2 | 3/2018 | Pettersson et al. |
| 10,002,207 B2 | 6/2018 | Pettersson |
| 10,013,901 B2 | 7/2018 | Chapuis et al. |
| 10,071,844 B2 | 9/2018 | Chappell, Jr. et al. |
| 10,118,723 B2 | 11/2018 | Clark et al. |
| 10,121,191 B2 | 11/2018 | Ninomiya et al. |
| 10,123,634 B2 | 11/2018 | Volz et al. |
| 10,287,047 B2 | 5/2019 | Zeilstra |
| 10,287,048 B2 | 5/2019 | Sytema et al. |
| 10,417,606 B2 | 9/2019 | Panchamgam |
| 10,441,094 B2 | 10/2019 | Kim et al. |
| 10,470,594 B2 | 11/2019 | Burns |
| 10,540,821 B2 | 1/2020 | Musunuri et al. |
| 10,552,792 B2 | 2/2020 | Mattingly et al. |
| 10,642,551 B2 | 5/2020 | Sloan, IV et al. |
| 10,643,177 B2 | 5/2020 | Murthy et al. |
| 10,699,058 B2 | 6/2020 | Arora et al. |
| 10,750,866 B2 | 8/2020 | Grupenhof |
| 10,752,387 B2 | 8/2020 | Jonker et al. |
| 11,568,356 B1* | 1/2023 | Rochon .................. G06T 11/00 |
| 2003/0052040 A1* | 3/2003 | Brener .................... B65D 5/52 |
| | | 206/736 |
| 2003/0105542 A1 | 6/2003 | Arnold et al. |
| 2003/0215357 A1 | 11/2003 | Malterer et al. |
| 2004/0060884 A1 | 4/2004 | Nook et al. |
| 2004/0211739 A1 | 10/2004 | Lembe |
| 2005/0043836 A1 | 2/2005 | Jaworski et al. |
| 2006/0108301 A1 | 5/2006 | Polvere et al. |
| 2006/0118502 A1 | 6/2006 | Polvere et al. |
| 2007/0000854 A1* | 1/2007 | Virvo ........................ A47F 5/10 |
| | | 211/72 |
| 2007/0050235 A1 | 3/2007 | Ouimet |
| 2009/0125875 A1 | 5/2009 | Schmitter et al. |
| 2010/0012600 A1 | 1/2010 | Clontz et al. |
| 2012/0004769 A1 | 1/2012 | Hallenbeck et al. |
| 2013/0240461 A1* | 9/2013 | Brevda ................. A47F 5/0838 |
| | | 211/13.1 |
| 2014/0067104 A1 | 3/2014 | Osterhout |
| 2014/0121820 A1 | 5/2014 | Das et al. |
| 2014/0180642 A1 | 6/2014 | Yang et al. |
| 2016/0227811 A1 | 8/2016 | Jones et al. |
| 2016/0260148 A1 | 9/2016 | High et al. |
| 2017/0049253 A1 | 2/2017 | Agnoli et al. |
| 2018/0032639 A1 | 2/2018 | Nakagawa et al. |
| 2018/0050833 A1 | 2/2018 | Sytema et al. |
| 2018/0075506 A1 | 3/2018 | Burkhard et al. |
| 2018/0215485 A1 | 8/2018 | Koet et al. |
| 2018/0232799 A1 | 8/2018 | Kitagawa et al. |
| 2018/0247261 A1 | 8/2018 | Smith et al. |
| 2019/0012622 A1 | 1/2019 | Nishimura et al. |
| 2019/0258856 A1 | 8/2019 | Garcia et al. |
| 2019/0276241 A1 | 9/2019 | Royce et al. |
| 2019/0302737 A1 | 10/2019 | De Wit et al. |
| 2020/0009684 A1 | 1/2020 | Hibinger |
| 2020/0093286 A1 | 3/2020 | Brenner et al. |

FOREIGN PATENT DOCUMENTS

| | | |
|---|---|---|
| KR | 101735265 B1 | 5/2017 |
| WO | 2020/079235 A1 | 4/2020 |

OTHER PUBLICATIONS

"Analytical Assortment Optimization", McKinsey & Company, Retail Analytics, pp. 1-20 (Oct. 2019).
Garrido-Morgado, A., and González-Benito, O., "Merchandising at the point of sale: differential effect of end of aisle and islands", BRQ Business Research Quarterly, vol. 18, pp. 57-67 (2015).
Grumomigs, "How to reduce the size of a box", Retrieved from Internet URL: https://www.youtube.com/watch?v=6fqBltiXlfY, p. 1 (2016).
Hubner, A., and Schaal, K., "A shelf-space optimization model when demand is stochastic and space-elastic", Omega, vol. 68, pp. 139-154 (2016).
Ishichi, K., "Shelf-space Allocation Model with Demand Learning", Operations and Supply Chain Management, vol. 12, No. 1, pp. 24-30 (2019).
Murray, C.C., et al., "Joint Optimization of Product Price, Display Orientation and Shelf-Space Allocation in Retail Category Management", Journal of Retailing, vol. 86, Issue 2, pp. 125-136 (2010).
Sevilla, J., and Townsend, C., "The Space-to-Product Ratio Effect: How Interstitial Space Influences Product Aesthetic Appeal, Store Perceptions, and Product Preference", Journal of Marketing Research, vol. 53, Issue 5, pp. 665-681 (2016).
Timonina-Farkas, A., et al., "Product assortment and space allocation strategies to attract loyal and non-loyal customers", European Journal of Operational Research, vol. 285, pp. 1058-1076 (2020).
Warras, E., "Optimizing Shelf Space Allocation in Grocery Retail", Master's Thesis, Aalto University, pp. 1-80 (2019).
Non-Final Office Action dated Oct. 6, 2021 in U.S. Appl. No. 16/877,422, 24 pages.
Final Office Action dated May 26, 2022 in U.S. Appl. No. 16/877,422, 20 pages.
Notice of Allowance dated Feb. 7, 2023 in U.S. Appl. No. 16/877,422, 10 pages.

* cited by examiner

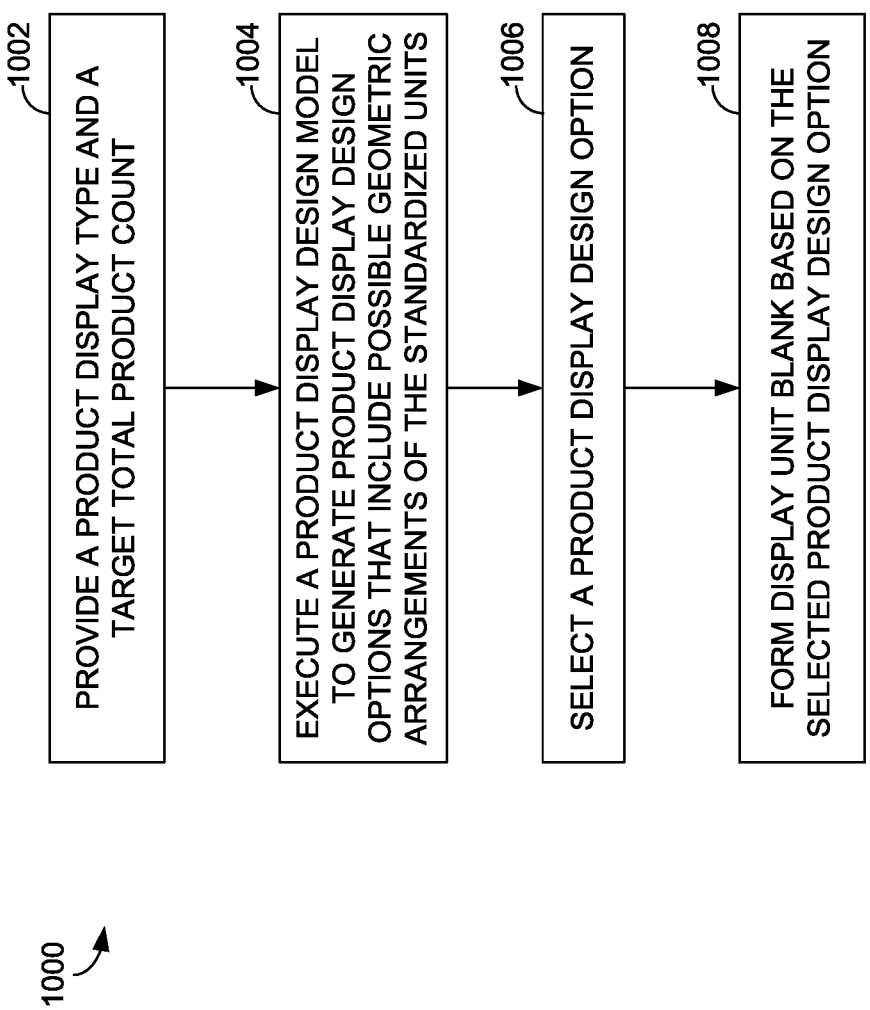

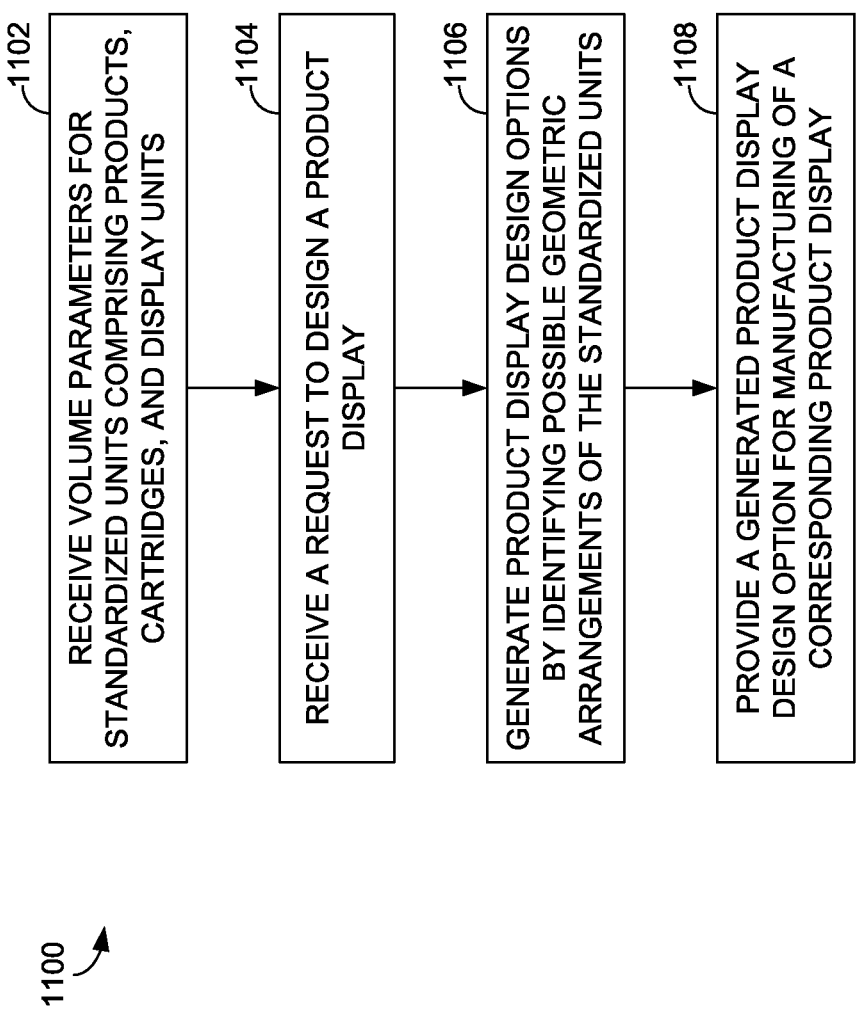

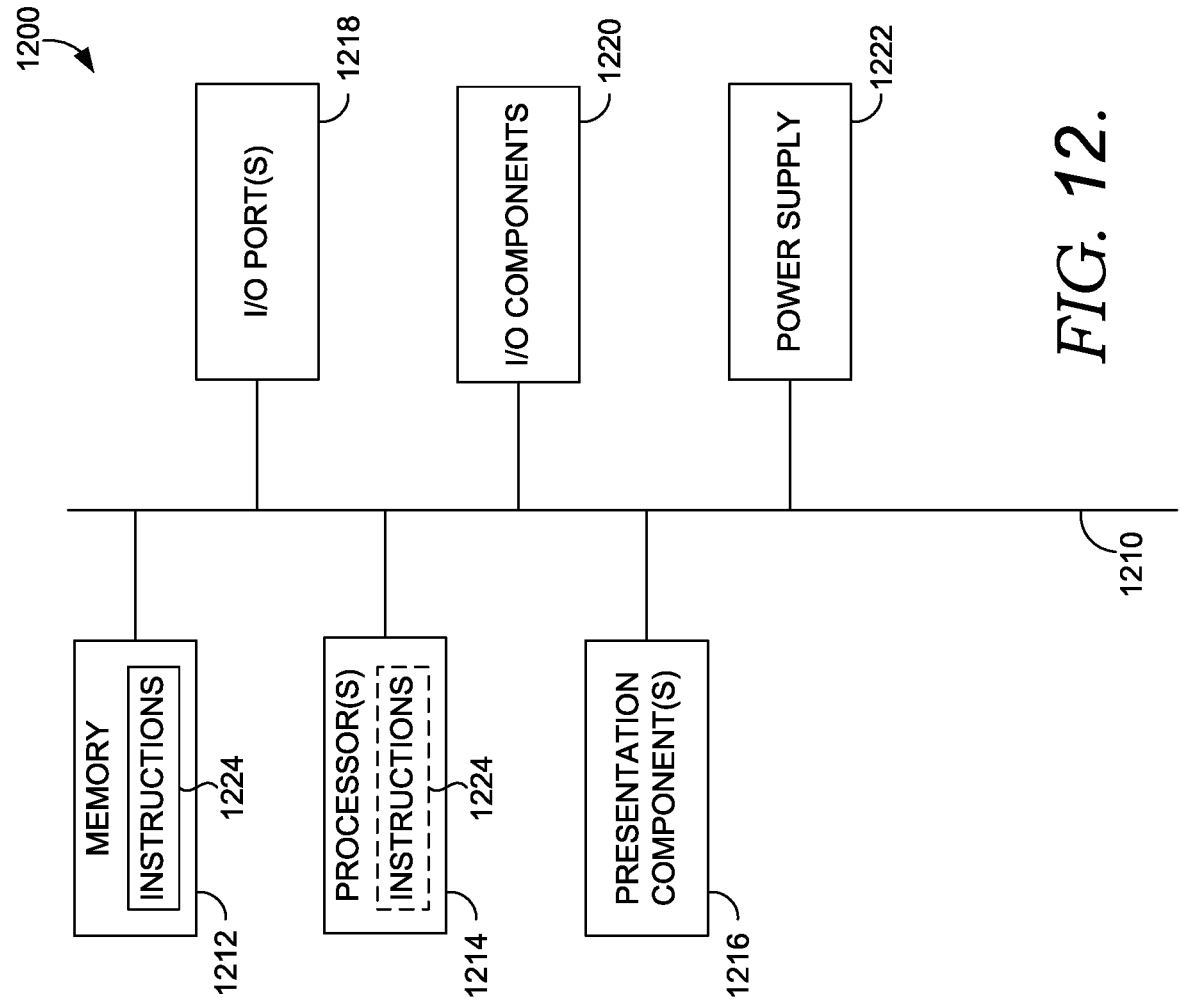

PRODUCT DISPLAY DESIGN AND MANUFACTURING USING A PRODUCT DISPLAY DESIGN MODEL

CROSS-REFERENCE TO RELATED APPLICATIONS

This application is a continuation application of U.S. patent application Ser. No. 16/888,361, filed on May 29, 2020, entitled "Product Display Design and Manufacturing Using a Product Display Design Model," which is expressly incorporated herein by reference in its entirety.

BACKGROUND

Traditional retailers often showcase products using in-store product displays. These displays are designed to maximize product visibility and minimize space. Retailers generally seek to customize product displays to align with store-level objectives. The design and manufacture of product displays consider variables that include a store's physical layout, the store's location, the time of year the product display is used, the type and weight of products within the product display, and the product display's geometric structure. Because of the variables involved, the number of possible product display designs is endless. Retailers and manufacturers continually attempt to improve product display designs within manufacturing capabilities.

SUMMARY

At a high level, aspects described herein relate to processes for designing and manufacturing product displays. In particular aspects, methods of manufacturing product displays include manufacturing product displays based on a product display design option that is generated using a computerized product display design method. Other aspects relate to computer programs, systems, and methods that implement a product display design model to generate a product display design option for manufacturing a corresponding product display.

To design a product display, the product display design model is executed on a computing device to provide product display design options. Each product display design option corresponds to a design for a product display. One or more of the product display design options can be selected to manufacture the corresponding product displays.

To generate the product display design options, the product display design model receives inputs that can include any of a target total product count, product types, a target mix ratio, and a product display type. The target total product count is the sum of products to be presented by the product display. The product types identify which of a variety of different products is to be presented by the product display, while the target mix ratio identifies the proportional amount of each product type. And the product display type indicates the structural characteristics of the desired product display, such as a stand-alone display, a countertop display, a hanging display, and the like.

The product display design model uses the inputs to identify display unit types associated with the product display type, cartridge types associated with the display unit types, and volume parameters that indicate the volume of space that define the products, cartridges, and display units. The volume parameters for each of the products, cartridges, and display units (also called standardized units) are predetermined and stored as part of a product display dataset. Using the volume parameters, the product display design model identifies geometric arrangements of the product within the cartridges and the cartridges within the display units. Each of the product display design options generated by the product display design model comprises one of the geometric arrangements.

The product display design model selects one or more of the product display design options for manufacturing the corresponding product display. Each product display design option has an actual total product count and an actual mix ratio that is based on the geometric arrangement associated with the product display design option. The product display design model compares the actual total product count to the target total product count and the actual mix ratio to the target mix ratio. The product display design options are ranked, where the highest ranked product display design options having actual values closest to the target values based on the comparisons. The product display design model may then select one or more of the highest ranked product display design options for manufacturing a product display.

A manufacturing device is used to form display unit blanks, cartridge blanks, and any other additional design features based on the one or more selected product display design options. The display unit blanks are configured to be constructed into display units, while the cartridge blanks are configured to be constructed into cartridges. The product display design option provides instructions for assembling the constructed display units and cartridges, each of which comprises products of one product type, into the product display.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 10 is a flow diagram of another example method for manufacturing a product display designed using a product display design model, in accordance with an aspect described herein;

FIG. 11 is a flow diagram of a computerized method for designing a product display for manufacture, in accordance with an aspect described herein; and FIG. 12 is a block diagram of an example operating environment in which embodiments of the present technology may be employed.

DETAILED DESCRIPTION

Figure 1:
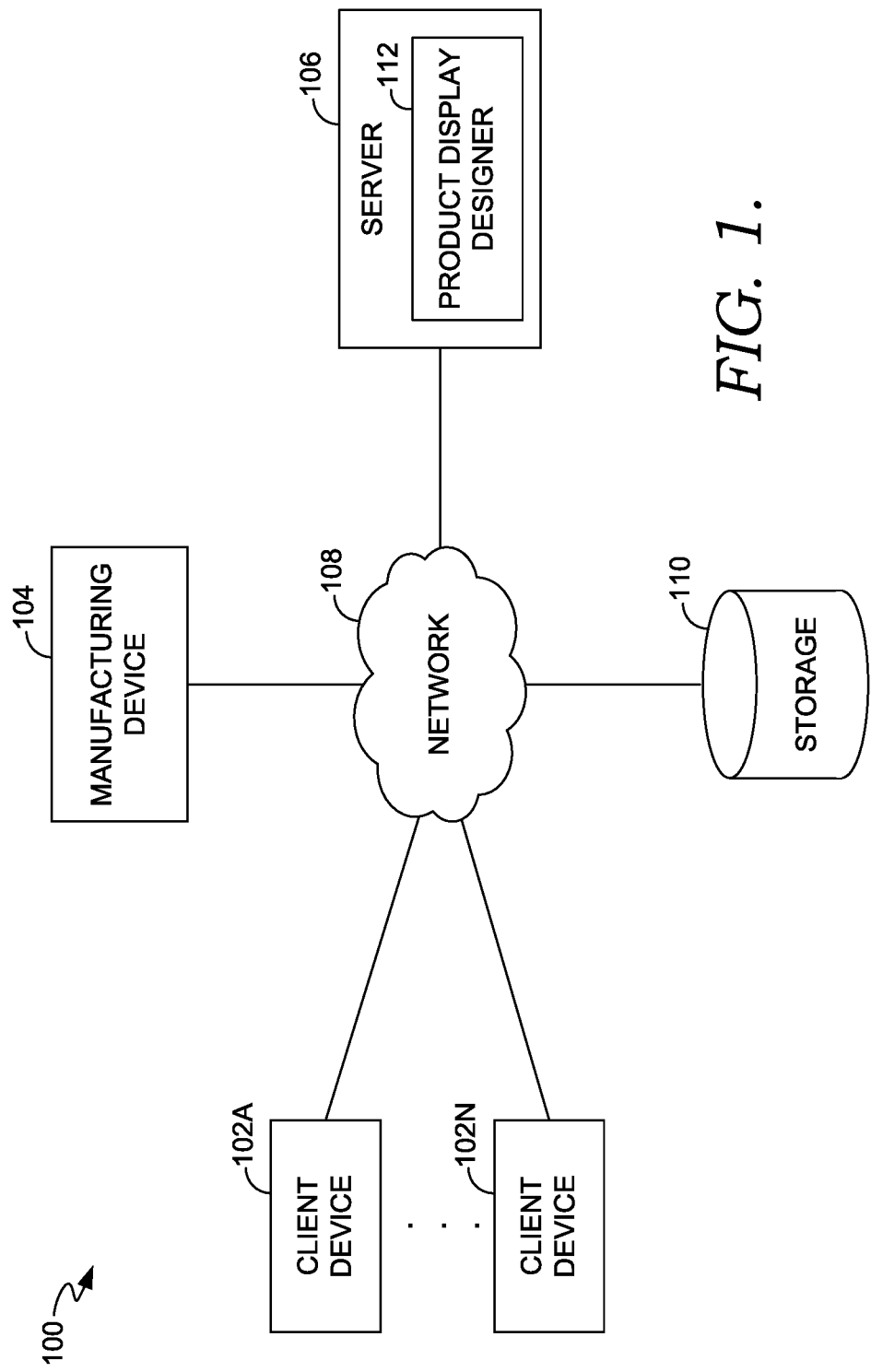
FIG. 1 is a block diagram of an example operating environment suitable for use in implementing the present technology, in accordance with an aspect described herein.

Throughout this disclosure, various terminology is used to describe how to design and manufacture product displays. The following definitions are provided to aid in better understanding the disclosed technology. It is intended that the definitions be used as a guide, and that some flexibility should be applied when interpreting the terminology based on the context in which it is used.

"Products" broadly include any tangible item. Within the context of this disclosure, products usually include tangible items provided for sale at a physical location, such as a retailer. Products can be separated into "product types." A product type defines products that are the same in that they include the same structural and compositional characteristic. For instance, two products that are the same tangible item are both considered to be the same product type. Since a product is a tangible item, the product occupies a volume of space. The volume of space occupied by the product is called the "product volume." Each product of the same product type will have the same product volume.

"Product displays" generally include any structure that is designed to present a product. There are various types of product display designs, such as a stand-alone display that supports itself and rises upward to present products, a counter type display configured to present products on a countertop, and a hanging display that is supported from another object when presenting products. Each of these, among other examples, is referred to as a "product display type." A product is presented when it is visibly observable by someone at the physical location.

Product displays comprise individual "display units." One or more display units may be grouped together to form the product display. Display units generally comprise different types that can be associated with different product display types, which are referred to as "display unit types." Display units of the same display unit type each have the same structural characteristics. Display units comprise a "display unit volume," which is the volume of space associated with each display unit that is designated to receive and hold cartridges.

A "cartridge" is an individual unit that is configured to hold products. Cartridges can generally be placed within display units in various arrangements, thus allowing the products held by the cartridges to have various arrangements that can be presented by the product display. A cartridge also occupies a volume of space that is called a "cartridge volume." Cartridges can also comprise different cartridge types. A "cartridge type" distinguishes between cartridges that have different structural characteristics, such as different volumes or geometric shapes. Two cartridges having the same shape and volume are part of the same cartridge type.

"Standardized units" include products, cartridges, and display units. What is meant by "standardized" is that each product, cartridge, and display unit is defined by a volume of space that it occupies (in the case of products and cartridges) or that it designates for use in holding other standardized units (in the case of display units). Here, the specific volume of space for standardized units comprises product volumes, cartridge volumes, and display unit volumes. Thus, each product associated with the same product type product type has the same product volume, each cartridge associated with the same cartridge type has the same cartridge volume, and each display unit associated with the same display unit type has the same display unit volume. The volume of each of the standardized units can be described by "volume parameters," which are measurements that can be used to determine the volume or other geometric characteristics of the standardized units. Volume parameters include measurements such as length, width, height, radius, angles, and the like.

A "product display design model" generally describes a rule-based, machine-executable operation or series of operations that receives various inputs, including one or more of the standardized units, and outputs product display design options. A "product display design option" describes a product display by indicating the display units, the cartridges, and the products, and the arrangement of each within the product display.

Historically, the process of designing product displays has been an intensive endeavor. Small retailers had a limited number of predesigned options from which to choose. In many cases, these predesigned options did not meet all of the retailers' criteria because either the product display presented too many or too few products, or the product display did not present an ideal mix ratio of products. Even though predesigned options were not ideal, small retailers had no other choice due to the laborious and time intensive, manual task of designing and manufacturing product displays. Larger retailers, on the other hand, would often engage product manufactures to design a product display specifically for the retailer. However, this too was a challenging task because many larger retailers have store locations spread across different regions. Thus, while one product display worked for one location, that same product display might not meet the specific needs of another location. There was no practical way to design different product displays for different locations.

These challenges stem from the demanding task of actually designing the product displays. Historical approaches for designing product displays required design, marketing, and accounting teams to each assess a retail location and determine the best type of product display design. It was not just impractical, but nearly impossible, to make these types of assessments for every single retail location, as the best design for a product display for each of the different locations was one of an infinite number of possible product display designs.

The past approaches for designing product displays required such extensive design because the historically performed manual methods could not be computerized. At most, the design team would use a computer-based image program to draw out product displays conceived by the team's imagination. The design of the product display itself, however, could not be generated by a computer because of the infinite number of possible outcomes and no limit on the number of possible designs. Additionally, unlike typical computational problems, traditional attempts have failed to solve the problem of computationally designing a product display because there is no objectively correct identifiable output for a model to determine. In essence, with an unlimited number of options for each variable, computers were unable to generate product display design outputs.

The technology presented herein allows a computer, for the first time, to fully design a product display. Unlike the traditional manual methods described, the disclosed technology defines specific volumes of space occupied or used by standardized units. The products, cartridges, and display units that form the product displays have known product volumes, cartridge volumes, and display unit volumes. By doing this, it is possible to determine a finite number of arrangements when products are oriented within cartridges and cartridges are oriented within display units.

For example, the total product volume occupied by any given number of products cannot be greater than a cartridge volume in which the products are placed. However, the products can be arranged within the cartridge using different orientations. In doing so, some arrangements allow the cartridge to hold more products, while the cartridge holds fewer products when the products are in a different arrangement. This similarly applies to arranging cartridges within display units. In this way, the number of possible geometric arrangements is limited to a finite number, thus allowing a computer to accomplish the task of designing product displays. As a result, product displays can be objectively designed in a manner of minutes, as opposed to the days, and even weeks, it took using the subjective traditional manual methods.

One example computer-implemented method that can be employed to achieve these benefits includes receiving volume parameters for standardized units. The standardized units comprise products, cartridges, and display units. Here, the display units are configured to hold the cartridges, while the cartridges are configured to hold the products.

Each of the standardized units has been defined in terms of its volume parameters, which describes the geometric structure. The volume occupied or used by each standardized unit can be determined from the volume parameters. For instance, a product (such as a chocolate bar) has a length, height, and width. Each product of the same product type (i.e., the same chocolate bar) has the same length, height, and width. Thus, the product volume can be determined using these parameters and it is the same, or "standardized," for each product of the same product type.

Similarly, volume parameters can be defined for cartridges. The cartridges may also include various cartridge types, such as a full cartridge or a half cartridge. Each cartridge of the same cartridge type has the same volume parameters. In some aspects of the disclosed technology and within the industry, generally, a cartridge may also be referred to as a "carton."

Display units can also include volume parameters describing the geometric structure of the display units. The volume parameters for display units may be defined in different ways. One manner of defining the volume parameters for display units is to define the volume parameters relative to the volume of space configured to hold the cartridges. That is because some structural parts of display units could be used for purposes other than presenting products, such as advertising space, a stand to hold the display unit, an opening for hanging the display unit from a support, and so forth. By defining the display unit volume using the volume parameters in terms of the volume configured to hold the cartridges, the computer performing the method can easily determine how the cartridges can be arranged within the display unit, which will be described in more detail.

In general, volume parameters can be defined for existing products, cartridges, and display units by measuring each product type, cartridge type, and display unit type, and storing this data in computer-readable media, thus standardizing the existing products, cartridges, and display units.

Volume parameters can be defined for newly created standardized units. In creating new standardized units, the standardized units can be designed so that they are modular with respect to the other standardized units. Using a one-dimensional example for simplicity, a first product has a width of 1 inch, a second product has a width of 2 inches, and a first cartridge has a width of 2 inches, a second cartridge has a width of 4 inches, and a display unit has a shelf length of 12 inches. Here, the design has a modular format with respect to the width (one of the volume parameters in this example). There are different arrangements of the first and second products within the first and second cartridges. There are also various different arrangements of the first and second cartridges that can be constructed on the shelf. This modularity can be determined for all volume parameter of products, cartridges, and display units. Additional modularity is achieved by configuring a display unit design so that one display unit type is usable with different product display types.

The defined volume parameters of the standardized units can then be stored on computer-readable media as a product display dataset for recall when designing a product display using a product display design model.

A request can be received to design a product display. The request may specify various criteria when designing the new product display, including one or more product types, a target total product count, a product display type, and a target mix ratio. Here, the target total product count is the total number of products, of all product types, within the product display, and the target mix ratio indicates a proportion of the product types relative to the target total product count. For instance, the request might include white chocolate, dark chocolate, and milk chocolate bars as product types, a target total product count of 100 products, a freestanding tower as the product display type, and a target mix ratio of 10% white chocolate bars, 25% dark chocolate bars, and 65% milk chocolate bars.

A product display design model can be used to identify geometric arrangements for each of the standardized units related to the request. That is, the products corresponding to the product types are spatially arranged within cartridges. The cartridge types can be identified based on display unit types that identified based on the received product display type. The cartridges are also spatially arranged within the display unit. Put another way, the geometric arrangements of the product volume within the cartridge volume are identified, while the geometric arrangements for the cartridge volume within the display unit volume are identified. In doing this, there is a finite number of geometric arrangements identifiable from these standardized units.

The identified geometric arrangements of standardized units are included as product display design options. Each product display design option has a specific arrangement of products within the cartridges and the cartridges within the display unit. An actual total product count and an actual mix ratio is associated with each of the product display design options. That is because each geometric arrangement includes a particular number of products for each product type, the sum of which provides the actual total product count, and the proportion of products for each product type relative to the actual total product count provides the actual mix ratio.

A product display design option can then be selected from among the product display design options that have been identified. This may be done by comparing the target total product count to the actual total product count or comparing the target mix ratio to the actual mix ratio to identify which of the product display design options most closely fits the initial request. A lowest average difference is one suitable method for comparing the target values and the actual values to determine which product display design option is closest to the initial request.

The product display design option can be provided for manufacturing the product display. Display unit blanks can be formed such that they can be constructed into a display unit of the product display. The number of cartridges and the cartridge types of the product display design option can be used to form corresponding cartridge blanks that, when constructed, provide the physical structure of the cartridges for use with the display units in assembling the product display. The geometric arrangement of the product display design option indicates the product type held by each cartridge and indicates which locations to place the filled cartridges within the constructed display units. When assembled according to the arrangement of the product display design option, the resulting structure is a completed product display.

The computer-implemented method described is just one example of this technology. Various other computer-implemented methods, media, and systems for designing product displays, along with methods of manufacturing product displays, are further described and can be derived from the description that follows, which references the drawings.

FIG. 1 depicts a block diagram of example operating environment 100 suitable for use in implementing the described technology. Generally, operating environment 100 is suitable for designing and manufacturing product displays. Among other components not shown, operating environment 100 includes client device 102A-102N, manufacturing device 104, and server 106, each communicating through network 108. Operating environment 100 is further illustrated with storage 110 in communication with network 108.

Operating environment 100 is illustrated as having client devices 102A through 102N, which are in communication via network 108. Client device 102A is illustrated as having an ellipsis drawn between it and client device 102N, which is meant to indicate that any number of client devices may be associated with operating environment 100, including one or more client devices. As will be further described, this arrangement is only an example. In another arrangement, one or more of client devices 102A through 102N includes aspects of server 106. In another specific arrangement, manufacturing device 104 hosts one or more of the client devices. Again, all distributed and integrated arrangements of the components is contemplated herein.

Client devices, such as client devices 102A through 102N, can be any type of computing device capable of being operated by a client, which may be any person or entity that designs, manufactures, requests, or uses product displays. In some implementations, client devices 102A through 102N are the type of computing device described in relation to FIG. 12. For example, client device 102A may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. Although reference has been made only to client device 102A, it is intended here and throughout this disclosure that client devices 102A through 102N are equally considered.

Client device 102A can include one or more processors and one or more computer-readable media. The computer-readable media may include computer-readable instructions executable by the one or more processors. The instructions may be embodied by one or more applications.

Applications executed by client device 102A facilitate the exchange of information between client devices 102A through 102N, manufacturing device 104, server 106, and storage 110. Among other functions, an application executed by client device 102A may facilitate receiving information at the client device, such as a request for a product display, including information related to target total product counts, target mix ratios, product types, product display types, and the like and provide this information to other components of operating environment 100. The application may facilitate receiving information from manufacturing device 104 and server 106, and retrieval of information from storage 110, such as a product display design option, and providing it to a client associated with client device 102A.

An application may take the form of a web application, which can run in a web browser, and could be hosted at least partially on the server-side of operating environment 100. In some cases, the application is integrated into the operating system (e.g., as a service or program). In other cases, the application may be integrated with product display designer 112, which is illustrated as residing on server 106. It is contemplated that "application" be interpreted broadly.

Manufacturing device 104 is generally suitable for manufacturing all or portions of display blanks, cartridge blanks, and any other structural feature of a product display. Some manufacturing devices and methods of using the devices that are suitable for use with the disclosed technology can be found in U.S. Provisional Application No. 62/849,243, filed on May 17, 2019, and entitled "Product Display Tower and Method of Making," which is hereby incorporated by reference in its entirety. Manufacturing device 104 may comprises a cardboard cutting machine or system assembly. There are numerous cardboard cutting machines suitable for forming cardboard blanks that can be used. Some examples include industrial cardboard cutting machines manufactured by Zemat Technology, Bosch, and Schubert. While display units and cartridges are many times formed from cardboard, other materials may be used as well. For instance, corrugated plastic materials are also suitable. As such, manufacturing device 104 may comprise a machine for forming or cutting corrugated plastics into desired structures. Manufacturing device 104 may also include a three-dimensional printing device that can form a desired three-dimensional printed structure, such as display blanks and cartridge blanks, from a number of three-dimensional printing materials. Other devices and the operation of these devices will be known by those of ordinary skill in the art, and they are intended to be within the scope of this disclosure. Specific devices and their operational methods that form display blanks, cartridge blanks, and other structural features are not described in great detail.

Server 106 generally supports product display designer 112. Server 106 includes one or more processors, and may include one or more computer-readable media. The computer-readable media includes computer-readable instructions executable by the one or more processors. The instructions may optionally implement one or more components of product display designer 112, described in additional detail below with reference to FIG. 2. Server 106 may be remote from client device 102A or integrated with client device 102A.

Storage 110 generally stores information including data, computer instructions (e.g., software program instructions, routines, or services), or models used in embodiments of the described technologies. Although depicted as a single database component, storage 110 may be embodied as one or more data stores or may be in the cloud. Memory 1212 of FIG. 12 is one example suitable for use as storage 110.

Components shown in FIG. 1 are illustrated as communicating via network 108, which may be wired, wireless, or both. Network 108 can include multiple networks, or a network of networks, but is shown in simple form so as not to obscure aspects of the present disclosure. By way of example, network 108 can include one or more wide area networks (WANs), one or more local area networks (LANs), one or more public networks such as the Internet, or one or more private networks. Where network 108 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 108 is not described in significant detail.

With continued reference to FIG. 1, and with reference to all of the figures generally, it should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. It should also be understood that any number of user devices, servers, and other components might be employed within operating environment 100, and each are intended to be within the scope of the present disclosure. Components of operating environment 100 may comprise a single device or multiple devices cooperating in a distributed environment or in the cloud.

Figure 2:
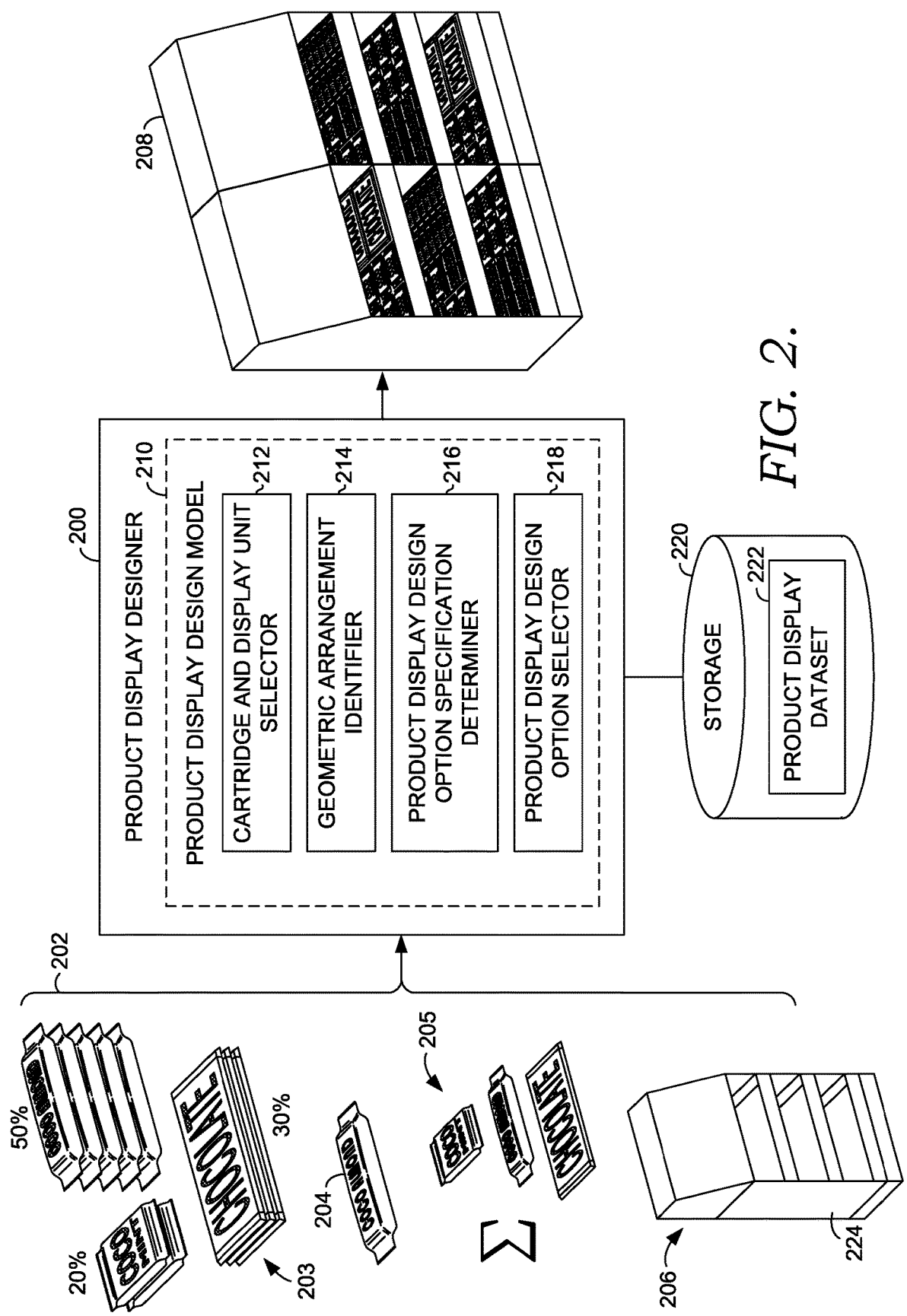
FIG. 2 is an example product display designer suitable for designing product displays, in accordance with an aspect described herein.

Turning now to FIG. 2, FIG. 2 illustrates example product display designer 200. FIG. 2 is just one example suitable for using the technology. Product display designer 200 is suitable for employment as product display designer 112 of FIG. 1. Many of the components of product display designer 200 include functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 12.

In general, product display designer 200 receives inputs 202, such as target mix ratio 203, product type 204 (which is intended to illustrate one or more product types), target total product count 205, and product display type 206, and outputs product display design option 208. Product display designer 200 of FIG. 2 includes product display design model 210, which when executed, determines product display design option 208 from inputs 202.

The example product display design model 210 comprises cartridge and display unit selector 212, geometric arrangement identifier 214, product display design option specification determiner 216, and product display design option selector 218. Each of these functional entities is illustrated and discussed in order to more clearly describe one example system for creating and executing product display design model 210.

As noted, product display designer 200 communicates with storage 220 to store and retrieve information usable or determined by product display design model 210. Storage 220 is illustrated as comprising product display dataset 222, which is used by product display design model 210 to determine product display design option 208.

Product display dataset 222 generally comprises information describing standardized units and volume parameters for each of the standardized units. Initially, product display dataset 222 may be generated by defining the standardized units. The standardized units comprise the products, cartridges, and display units for which the volume parameters are known.

Figure 3:
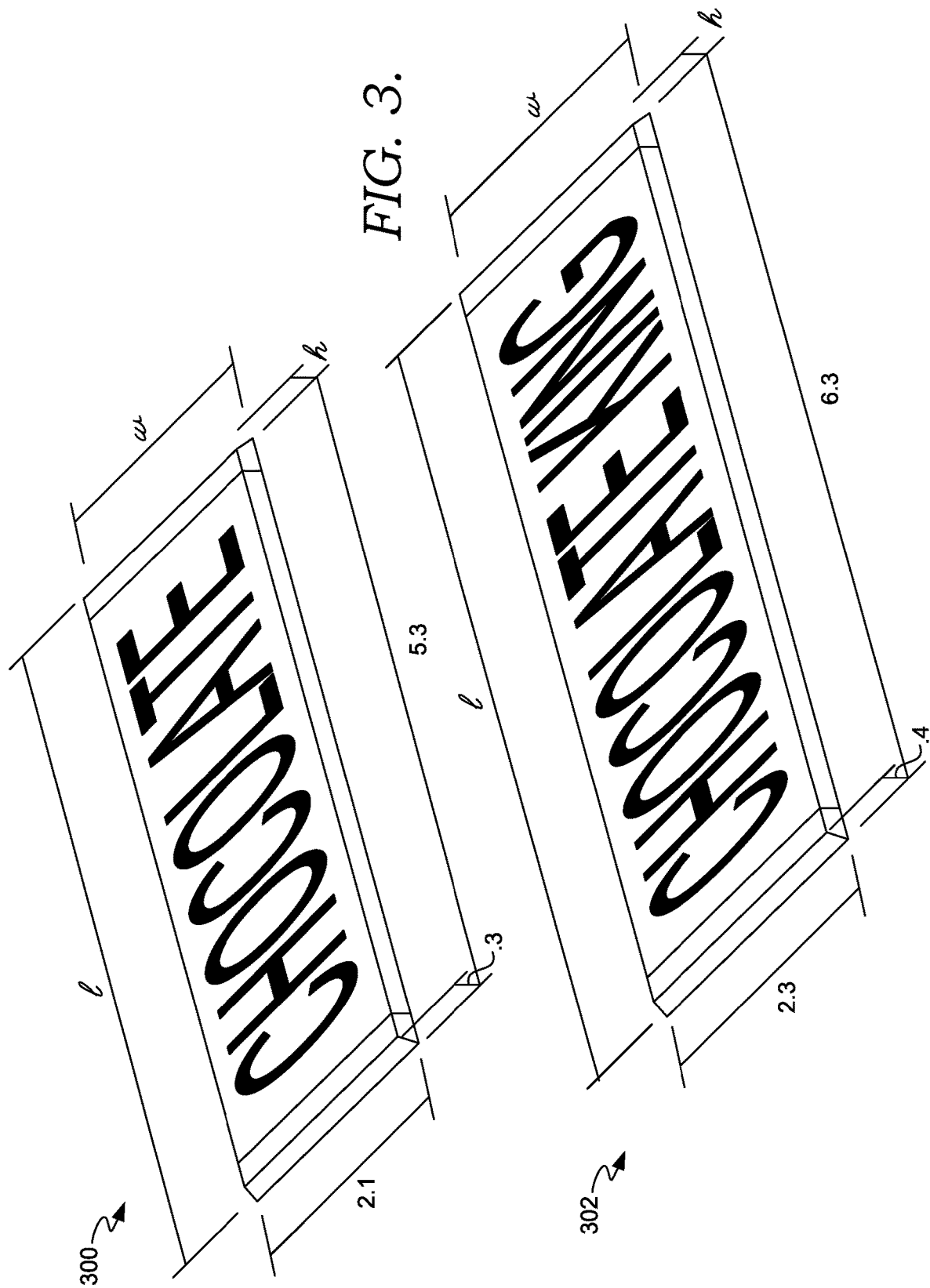
FIG. 3 illustrates two example products of different product types, in accordance with an aspect described herein.

FIG. 3 illustrates two products associated with different product types. FIG. 3 is illustrated to show volume parameters for various example product types, although it will be recognized that there can be many other products types that have any number of volume parameter values. First product 300 illustrates a first product type having a length l, a width w, and a height h. In the specific example illustrated by FIG. 3, first product 300 has a length of 5.3 inches, a width of 2.1 inches, and a height of 0.3 inches. As noted, different product types may have different volume parameters. As such, second product 302 of FIG. 3 is provided to illustrate a second product type also having a length l, a width w, and a height h. Second product 302 is illustrated having a length of 6.3 inches, a width of 2.3 inches, and a height of 0.4 inches. It is noted that, while some product types have different volume parameters than others, there are cases where different product types have the same volume parameters, but the products have different compositions (such as a chocolate bar made of milk chocolate versus a chocolate bar made of dark chocolate). Information about the various product types, along with their respective volume parameters and compositions, can be stored within storage 220 as part of product display dataset 222.

Product display dataset 222 can include standardized units defined from existing products, cartridges, and display units by standardizing the units, i.e., determining each unit's volumetric parameters. The use of product displays for presenting products is not new to retail. As such, these existing product displays can be standardized for use by product display designer 200. To standardized these existing units, the volume parameters for existing products and displays, and if available, cartridges, is measured. As existing product displays were not designed for use by product display design model 210, there may not be cartridges designed to fit within a display unit of an existing product display. Nevertheless, product display design model 210 can still use each of these existing units when they are standardized by defining them in terms of their volume parameters and other structural characteristics. Once the volume parameters are measured for the existing products and product displays, the information can be stored within storage 220 as part of product display dataset 222, thus defining them as standardized units usable by product display design model 210.

While existing products and displays may be suitable for use, new product displays and cartridges can be created and defined as standardized units. New display units and cartridges can be created and defined so that they are modular. One method to create modular standardized units is to define volume parameters of smaller standardized units as divisible by volume parameters of larger standardized units. For instance, using a one-dimensional example for simplicity, a length of a shelf within a display unit is 12 inches. For modularity, one cartridge type could have a length of 12 inches, while another has a length of 6 inches, yet another has a length of 4 inches, yet another has a length of 3 inches, and so forth. Defining the volume parameters in this way allows for numerous combinations of cartridges on the display unit shelf, while also limiting the number of possible arrangements of the cartridges on the shelf to a finite number. One or more, or all of the volume parameters can be defined in this manner, such that the cartridges are modular with respect to the display units. Put another way, the cartridge volume is modular with respect to the display unit volume. By making the cartridges modular with respect to the display units, the display units are configured to hold the cartridges.

Cartridges can be designed based on the sizes of various product types. Typically, there may be a large variety of product types, each having different volume parameters. One method of defining the volume parameters for new cartridges is to identify the distribution of volume parameter values for a volume parameter across all product types. Volume parameters for a cartridge can be based on the largest volume parameter measured for all the product types. For instance, if a largest product length is 10 inches, then the cartridge length for the cartridge might also be 10 inches. However, volume parameter values for the cartridges can be based on any product volume parameter, the largest volume parameter value being just one example. This can be done for one or more, or all volume parameters when designing the cartridge.

Another method of designing cartridges is to design cartridges based on the display units. One example would be to design a cartridge having a cartridge volume equivalent to the display unit volume available for holding the cartridge. Various cartridge types can be designed having volume parameters that are divisions of the volume parameters associated with the display unit volume, such as the example previously provided having a display unit shelf length of 12 inches, and the cartridge types having lengths that are divisions of 12 inches, e.g., 6 inches, 4 inches, 3 inches, etc.

Figure 4B:
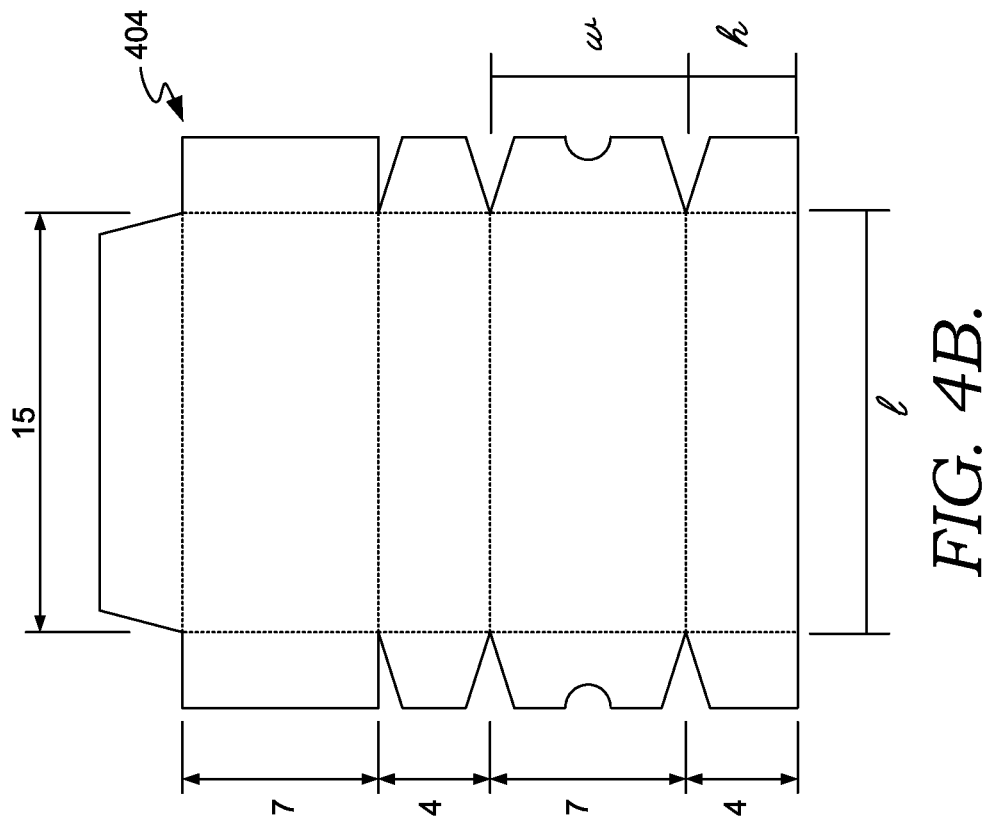
FIGS. 4A-4B illustrate an example cartridge with its associated cartridge blank, in accordance with an aspect described herein.
Figure 4A:
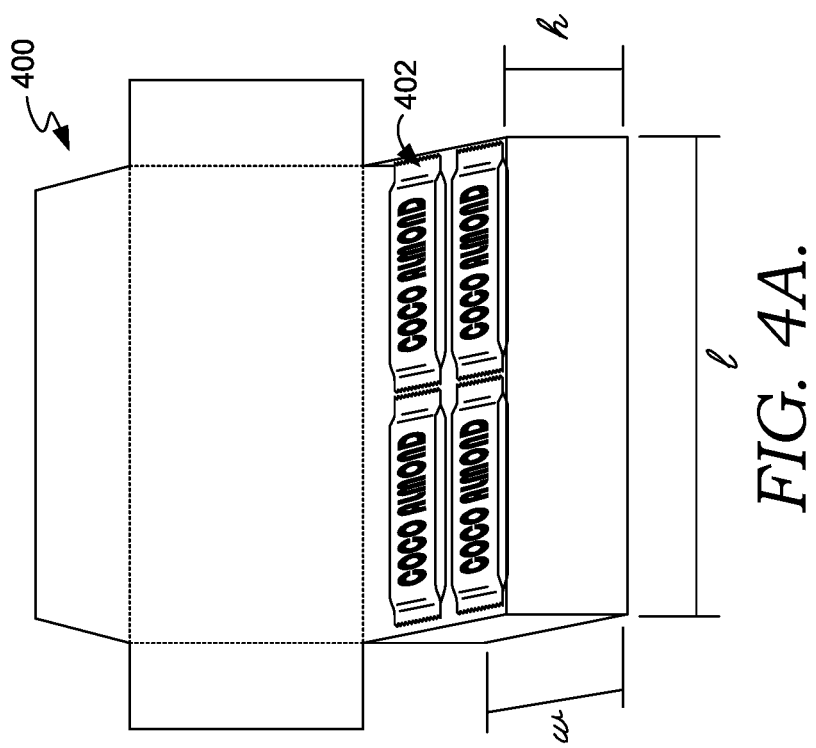
Figure 5B:
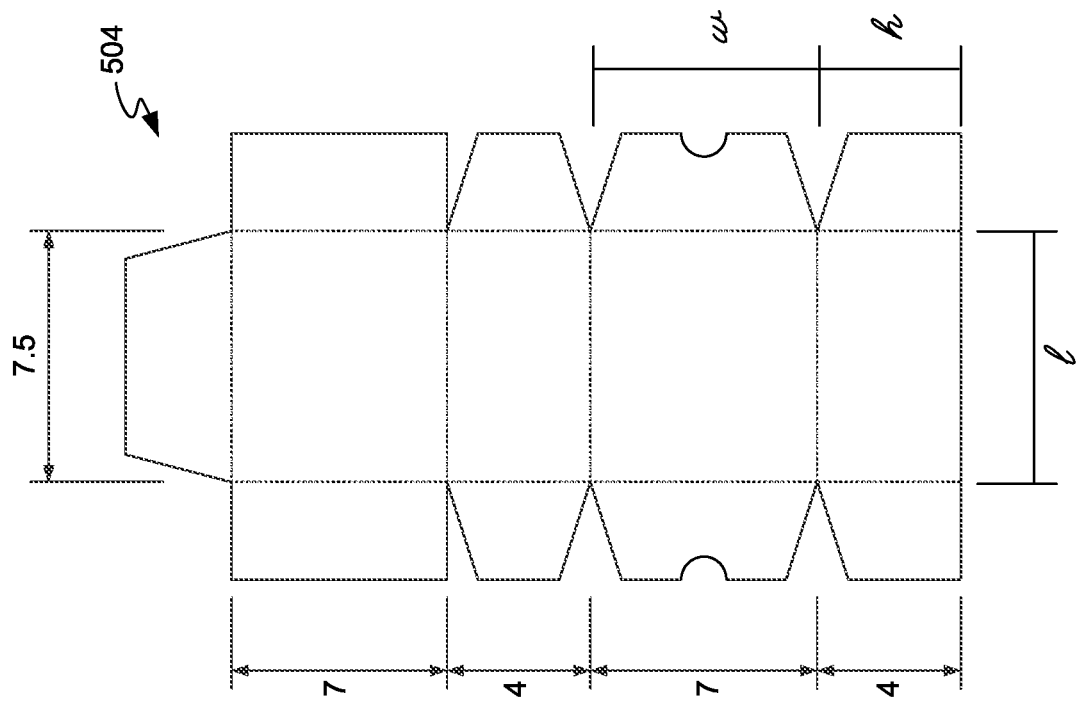
FIGS. 5A-5B illustrate another example cartridge with its associated cartridge blank, in accordance with an aspect described herein.
Figure 5A:
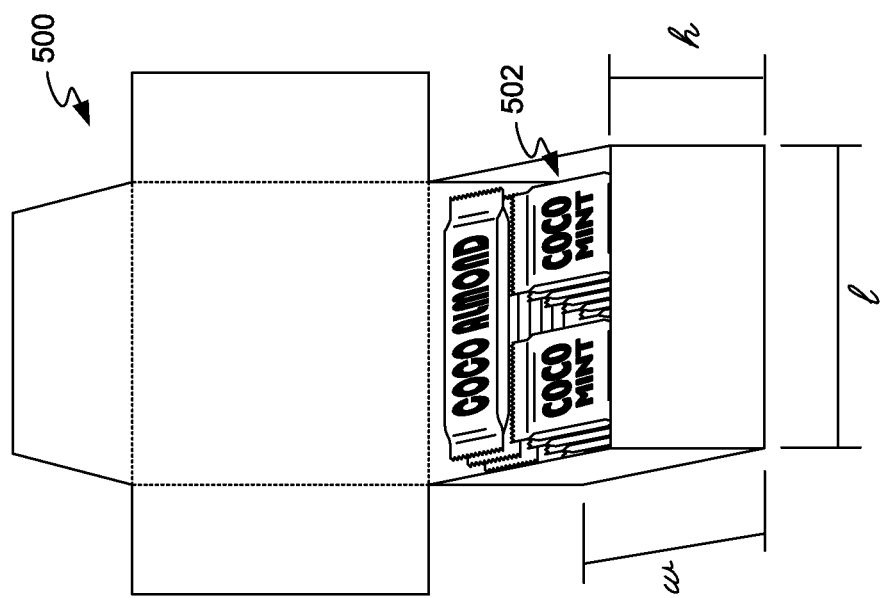
Figure 6:
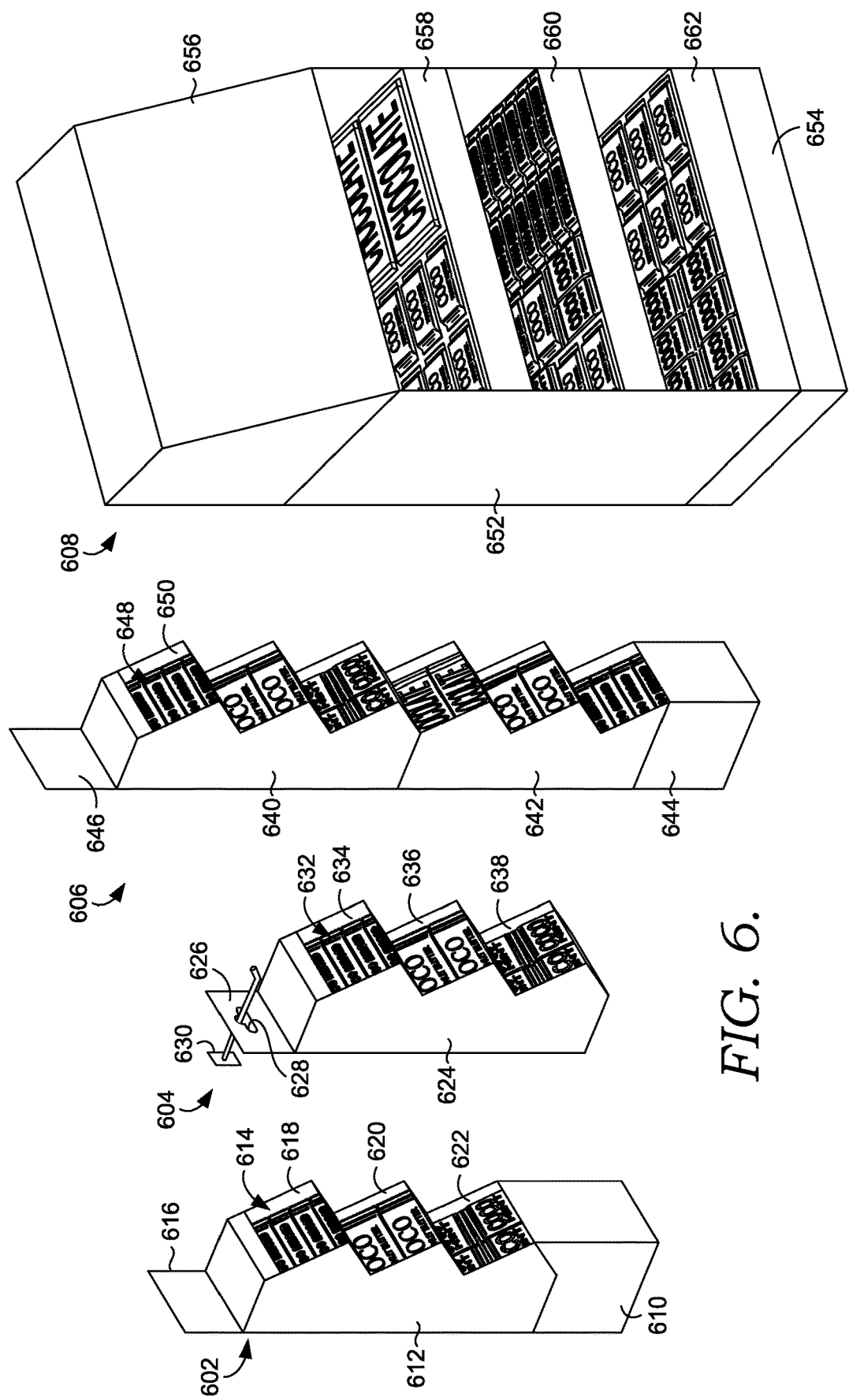
FIG. 6 illustrates some example product displays that can be designed and manufactured using the disclosed technology, in accordance with an aspect described herein.

FIGS. 4A-4B and FIGS. 5A-5B are provided as example cartridges for holding products that have been designed for modular use with display units, such as the display units associated with the product displays illustrated in FIG. 6. In general, cartridges are configured to hold products when the product volume is less than the cartridge volume.

Looking first to FIG. 4A, example first cartridge 400 is illustrated as holding products 402. The product volume of each product within products 402 and the product volume sum of products 402 in first cartridge 400 are each less than the cartridge volume. First cartridge 400 has been labeled with some of the volume parameters that could be used to determine its product volume and define first cartridge 400. Here, the length of first cartridge 400 has been labeled l, the width labeled w, and the height labeled h.

With reference to both FIG. 4A and FIG. 4B, FIG. 4B illustrates first cartridge blank 404. First cartridge blank 404 is an example cartridge blank associated with the same cartridge type as first cartridge 400. First cartridge blank 404 of FIG. 4B has also been labeled with some of its volume parameters, including length l, width w, and height h. As first cartridge blank 404 is the same cartridge type as first cartridge 400, first cartridge blank 404 can be constructed into a cartridge having the same volume parameters as first cartridge 400. Thus, in this example, length l, width w, and height h for each of first cartridge blank 404 and first cartridge 400 are the same.

As indicated, first cartridge blank 404 can be constructed into a cartridge that is the same as first cartridge 400. Dotted lines are provided in FIG. 4B to illustrate folding points to construct first cartridge blank 404 into a cartridge, such as first cartridge 400. Additionally, FIG. 4B provides some example values for volume parameters suitable for use. First cartridge blank 404 could be constructed into a cartridge having a length of 15 inches, a width of 7 inches, and a height of 4 inches.

As noted, various cartridge types can be used to increase the number of arrangements of cartridges located within a display unit, yet still keeping the total number of arrangements to a finite number. FIGS. 5A-5B are provided to illustrate another cartridge of a different cartridge type suitable for use with the technology. FIG. 5A illustrates second cartridge 500 holding products 502. Similarly, the product volume for each product of products 502 and the sum of the product volume for each of products 502 is less than the cartridge volume of second cartridge 500. Second cartridge 500 has been labeled with some of its volume parameters, including length l, width w, and height h.

Referencing FIG. 5B, the figure illustrates second cartridge blank 504. Second cartridge blank 504 is an example cartridge blank that is associated with the same cartridge type as second cartridge 500. Constructing second cartridge blank 504 into a cartridge would provide a cartridge having the same volume parameters as second cartridge 500 in FIG. 5A, Second cartridge blank 504 has also labeled with length l, width w, and height h indicating its volume parameters.

FIG. 5B also provides some example volume parameters suitable for use with the technology. Here, the volume parameters for an example cartridge, which are illustrated with respect to second cartridge blank 504, include a length l that is 7.5 inches, a width w that is 7 inches, and a height h that is 4 inches.

The example cartridge type that is associated with second cartridge 500 and second cartridge blank 504 include a volume parameter for length (7.5 inches) that is one half the volume parameter for length of the example cartridge type associated with first cartridge 400 and first cartridge blank 404 of FIGS. 4A-4B. All else being equal, the cartridge volume of the cartridge type associated with FIGS. 5A-5B is one-half the cartridge volume of the cartridge type associated with FIGS. 4A-4B. Regarding these specific examples, the cartridge volume of the cartridge type of FIGS. 5A-5B is 210 cubic inches, while the cartridge volume of the cartridge type associated with FIGS. 4A-4B is 420 cubic inches. The cartridge volume for the geometric shape of first cartridge 400 and second cartridge 500 is calculated by multiplying length l, width w, and height h. These example cartridge types and their cartridge volumes are simply examples.

It will be understood that the cartridges can take any shape or design. Various cartridge types can be designed based on one or more volume parameters of specific product types or may be designed based on one or more volume parameters of specific display unit types. It will also be understood by one of ordinary skill in the art how to determine a cartridge volume for a cartridge type, including cartridge types of different geometric shapes. It will also be understood that one or more, or all of the volume parameters can vary between cartridge types so that a variety of different cartridges can be used by product display design model 210 of product display designer 200.

As noted, display units can also be created and defined as standardized units for use by product display design model 210. Display units can also include various display unit types that are configured to be used with one or more product display types. In general, a display unit comprises all or a portion of a product display and is used to present products. FIG. 6 provides illustrations of some example product displays 602, 604, 606, and 608 comprising different product display types and different display unit types.

First product display 602 is associated with a first product display type that is a stand-alone type product display comprising first base 610 and first display unit 612. First base 610 is designed to provide support and additional elevation for first display unit 612, which rests atop first base 610 to present products, such as products 614. First display unit 612 is also illustrated comprising first top piece 616, which may be used as an area to display relevant advertising or product information. First display unit 612 comprises three product areas 618, 620, and 622 that are configured to hold cartridges with products, such as products 614. Additional detail on the product areas of the display units will be discussed. First product display 602 is suitable as an on-the-counter display that could be used in areas already having a surface that is elevated, such as a countertop or a checkout area.

Second product display 604 is associated with a second product display type that is a hanging type product display comprising second display unit 624. Second display unit 624 is the same display unit type as first display unit 612. Second display unit 624 is illustrated as having second top piece 626. Second top piece 626 comprises opening 628. Opening 628 can receive support 630. In this way, second product display 604 can hang from a particular location to present products, such as products 632. Second display unit 624 is illustrated as also having three product areas 634, 636, and 638 that are configured to hold cartridges having products, such as products 632.

In some cases, second display unit 624 is the same display unit type as first display unit 612. This provides a modular aspect to display units, allowing one display unit type to be used with different product displays. Put another way, a display unit can be interchangeable between product displays, including some product displays of different product display types. In general, different product display types may include the same display unit type and have different additional features that change the functionality of each product display, such as first top piece 616, second top piece 626 having opening 628, and first base 610.

Another example product display is provided by third product display 606, which is associated with a third product display type. Third product display 606 comprises two display units, including third display unit 640 and fourth display unit 642. Third product display 606 also includes second base 644 and third top 646. While both third display unit 640 and fourth display unit 642 are illustrated with three product areas, product area 650 holding products 648 within a cartridge (not illustrated) is identified as an example. The third product display type also takes advantage of the modular design of display units. Here, third display unit 640 and fourth display unit 642 are the same display unit type as first display unit 612 and second display unit 624. In general, some display units can be stacked or grouped so as to increase the total number of products being displayed by a product display, such as third product display 606 having third display unit 640 stacked atop fourth display unit 642, which is further set on second base 644 to provide support and additional overall height for third product display 606. The product display type of third product display 606 is suitable as a stand-alone type display that sits at floor level and extends upward.

Fourth product display 608 provides an example of a fourth product display type. Fourth product display 608 does not share a display unit type that is the same as first display unit 612, second display unit 624, third display unit 640, or fourth display unit 642. Instead, fifth display unit 652 is a different display unit type. Fifth display unit 652 comprises first shelf 658, second shelf 660, and third shelf 662 that are configured to hold cartridges and products. Fourth product display 608 includes third base 654 and fourth top 656. Fourth product display 608 is another example of a stand-alone type product display for presenting products.

As illustrated by FIG. 6, a display unit can be included as part of a plurality of display units and as part of additional features, such as a top or base, when the display unit is part of a product display. When a product display includes more than one display unit or a display unit with additional features, the display units and the additional features can be separately manufactured pieces that are coupled together, for instance, by using tape, glue, clamps, friction, and the like. In another aspect, the display units and the additional features can be formed as a single article, which may or may not have points of delineation.

Figure 7:
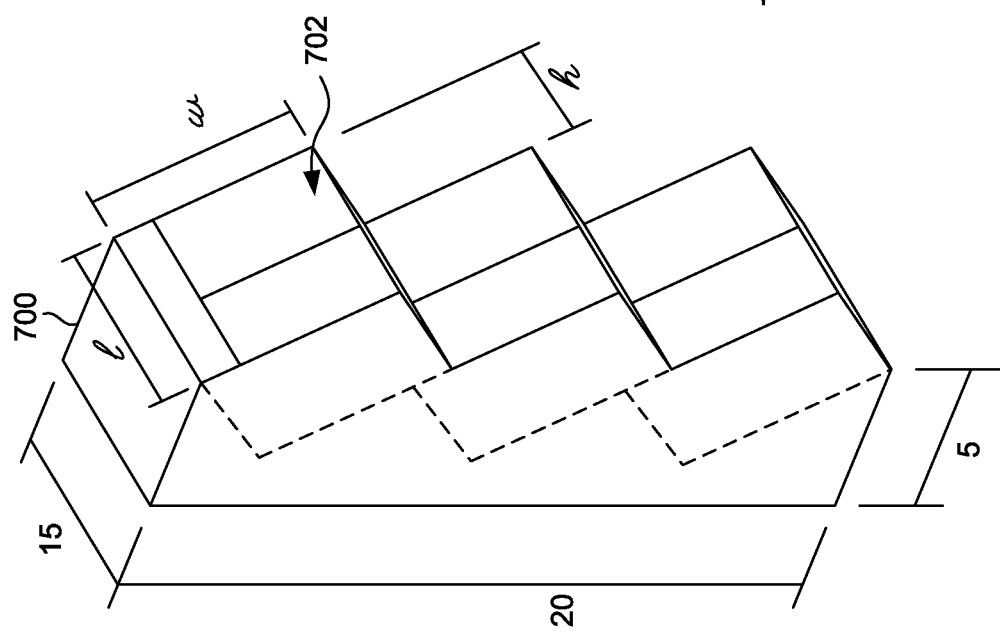
FIG. 7 illustrates an example display unit usable with the product displays of FIG. 6, in accordance with an aspect described herein.

Display units can be designed so that they are configured to hold cartridges that have products, so as to present the products as part of a product display. FIG. 7 is provided to illustrate more detailed aspects of display unit 700. In general, display units can be designed so that they can be combined together and with additional features, such as a base or top, in order to form a product display. One method to design display units with this modularity is to design display units that are symmetrical, such as example display unit 700. Symmetrical display units may stack together and side-by-side.

Display units can be designed having a recessed area for receiving and holding a cartridge. As illustrated in FIG. 7, display unit 700 includes product area 702 where products will be presented. Product area 702 can correspond to a recessed area that is configured to receive a cartridge or a plurality of cartridges and hold the cartridges into a display position where the products are visible.

In general, the volume parameters defined for the display unit can be based on the recessed area configured to receive the cartridge. That is, one or more of the volume parameters of the display unit can be substantially equal to one or more volume parameters of a cartridge. In some cases, the one or more volume parameters of the display unit is substantially equal to a volume parameter of a largest cartridge type. In another example, the display unit volume for the recessed area configured to receive the cartridge is substantially equal to a cartridge volume. Likewise, the display unit volume for the recessed area configured to receive the cartridge is substantially equal to a cartridge volume associated with a largest cartridge type.

For the purposes of describing the technology, substantially equal is intended to mean the same measured value plus or minus 10%. For example, if a length of a cartridge is 12 inches, a substantially equal corresponding length of a display unit location recessed for holding the cartridge can be 12 inches±10% (1.2 inches). This nomenclature is used to allow for some tolerances, such as the thickness of the cartridge material and the display unit material, and also because measurements of different objects do not generally yield a precisely equal value, even though the non-equal values are within manufacturing specifications and would be suitable for allowing the display unit to hold the cartridge. When practicing the invention, tighter tolerances may be used, such as a plus or minus 1%, 0.5%, or 0.1% difference between the one or more volume parameters of display units and cartridges.

Continuing with FIG. 7, display unit 700 includes a product area that corresponds to a recessed area configured to hold a cartridge. The recessed area can be used to define the volume parameters for display unit 700. Here, the volume parameters are exemplified by and labeled as length l, width w, and height h. As noted, one or more of the volume parameters may be substantially equal to one or more volume parameters for a cartridge, so that display unit 700 is configured to hold the cartridge in the recessed area.

Each of the cartridges and display units discussed is provided as an example, and is not intended to limit the invention to a particular type, size, or geometric shape of cartridge and display units. It will be recognized that there are many different combinations of cartridges and display units that can be designed to generate various product displays. It will also be recognized that various combinations of additional features, such a base or top, of product displays can be included in the product display, along with the cartridges and display units. Other additional features can be included with product displays to provide area for advertising, product description, or include additional geometric features with particular designs or shapes, such as a product display that is in the shape of the product or a particular object. All are intended to be within the scope of the technology described herein. Defining the volume parameters of cartridges based on the area configured to hold products and the volume parameters of display units based on the area configured to hold cartridges is one method that will enable the disclosed technology to work for all product display types.

One method of creating a cartridge design of a cartridge type or a display unit design for a display unit type is to use a three-dimensional modeling software to defined the geometric structure of a cartridge or display unit, e.g., a top, bottom, sidewalls, base, etc. The volume parameters can be defined using different values to create different cartridge types that are configured to be held by recessed areas of the display unit. Having designed the cartridge, the cartridge blank can be designed. Likewise, having designed the display unit, a display unit blank can be designed. This can be done using the same three-dimensional modeling program. One of ordinary skill in the art will understand how to design the cartridge blank having been provided with the designed cartridge, and similarly, will understand how to design a display unit blank having been provided the designed display unit. However, briefly, one method of designing cartridge blanks for a cartridge is to represent the three-dimensional cartridge as a two-dimensional shape. Similarly, the three-dimensional display unit can be represented as a two-dimensional shape. The two-dimensional shapes corresponding to the cartridge and the display unit provide a framework for the cartridge blank and the display unit blank, respectively. Each can be represented as one or more distinct two-dimensional pieces.

Having described examples of products, cartridges, and display units, and with reference back to FIG. 2, information related to each of these standardized units can be stored within storage 220 as part of product display dataset 222 and can be used by the product display design model 210 of product display designer 200. For example, information related to all of the measured values, including values for the volume parameters, can be included within product display dataset 222. Other measured values that relate to additional features of a product display or additional design features of a display unit not described by the display unit volume can be included within product display dataset 222. Additionally, product composition can also be included within product display dataset 222. Generally, any information utilized by product display designer 200 and product display design model 210 can be stored as part of product display dataset 222.

In general, product display designer 200 generates product display design options, such as product display design option 208. Product display design model 210 of product display designer 200 receives inputs 202 and utilizes product display dataset 222 to output product display design option 208. Inputs 202 may include one or more of target mix ratio 203, product type 204, target total product count 205, and product display type 206.

In the example provided by FIG. 2, product display design model 210 begins by employing cartridge and display unit selector 212. In general, cartridge and display unit selector 212 selects cartridge types and display unit types based on inputs 202.

In a specific example, cartridge and display unit selector 212 selects display unit types based on product display type 206. That is, each product display design type can be associated with one or more display unit types that make up their associated product displays, which is stored within product display dataset 222. Looking at FIG. 2 as an example, inputs 202 includes product display type 206, which comprises the display unit type associated with display unit 224.

As noted above, product displays can be designed to comprise modular or interchangeable display units of different display unit types. Cartridge and display unit selector 212 can select a display unit based on a display unit type that has been associated with the product display type during design. Cartridge and display unit selector 212 can access product display dataset 222 to identify the display unit type associated with product display type 206 received as part of inputs 202. Cartridge and display unit selector 212 selects the display unit associated with the identified display unit type.

In some implementations, a product display may comprise multiple display units of different display unit types. In such cases, cartridge and display unit selector 212 identifies from product display dataset 222 each of the display unit types that are part of the product display type and selects their associated display units.

Cartridge and display unit selector 212 can select a number of display units based on receiving target total product count 205. The selection may be further based on target mix ratio 203. For example, a display unit may have capacity to present a particular number of products. If target total product count 205 is greater than the capacity of the display unit, then cartridge and display unit selector 212 can select another display unit of the same type to increase the overall capacity between the two display units. This can be done for any number of products and display units.

In another example, the display unit may have capacity to only present a particular number of products of a target mix ratio. One method of determining the capacity of the display unit is to determine the total product volume of the target total product count with respect to the target mix ratio. For instance, if the target total product count is 100 and the target mix ratio is 50% coco almond chocolate bars, 30% milk chocolate bars, and 20% chocolate mint bars, then the total product volume of 50 coco almond chocolate bars, 20 milk chocolate bars, and 20 chocolate mint bars is determined by summation of the product volume for each individual product. If the total product volume is greater than the display unit volume, cartridge and display unit selector 212 can select another display unit of the same type to increase the total display unit volume until it is greater than the total product volume.

Cartridge and display unit selector 212 can also select cartridge types. The cartridge types can be selected based on the selected display unit types. Each display unit can be configured to hold cartridges of one or more cartridge types as determined by the design of the display unit. This association is determined and stored within product display dataset 222. Cartridge and display unit selector 212 can access product display dataset 222 to identify one or more of the cartridge types configured to be held by the selected display unit. Cartridge and display unit selector 212 selects the cartridges associated with the one or more identified cartridge types.

In some implementations, a client may provide a selection of a cartridge type or a display unit type, which is received by product display designer 200.

Display units and cartridges selected by cartridge and display unit selector 212 or received from a client device can be provided to geometric arrangement identifier 214. Generally, geometric arrangement identifier 214 identifies geometric arrangements of cartridges within display units. In some implementations, geometric arrangement identifier 214 identifies arrangements of products held by cartridges within a display unit.

Geometric arrangement identifier 214 can identify arrangements of cartridges within one or more display units, including display units of the same display unit type and display units of different display unit types. Geometric arrangement identifier 214 may identify arrangements of one or more cartridges within the one or more display units, including cartridges of the same cartridge type and cartridges of different cartridge types. In this way, geometric arrangement identifier 214 identifies the cartridge location arrangements within display units.

One method employed by geometric arrangement identifier 214 to identify the cartridge location arrangements within the display units iteratively identifies each combination of cartridges within the display units that maximizes the display unit volume holding the cartridge of the cartridge arrangement. The iterative identification can be performed for each cartridge type and each combination of cartridge types.

Figure 8:
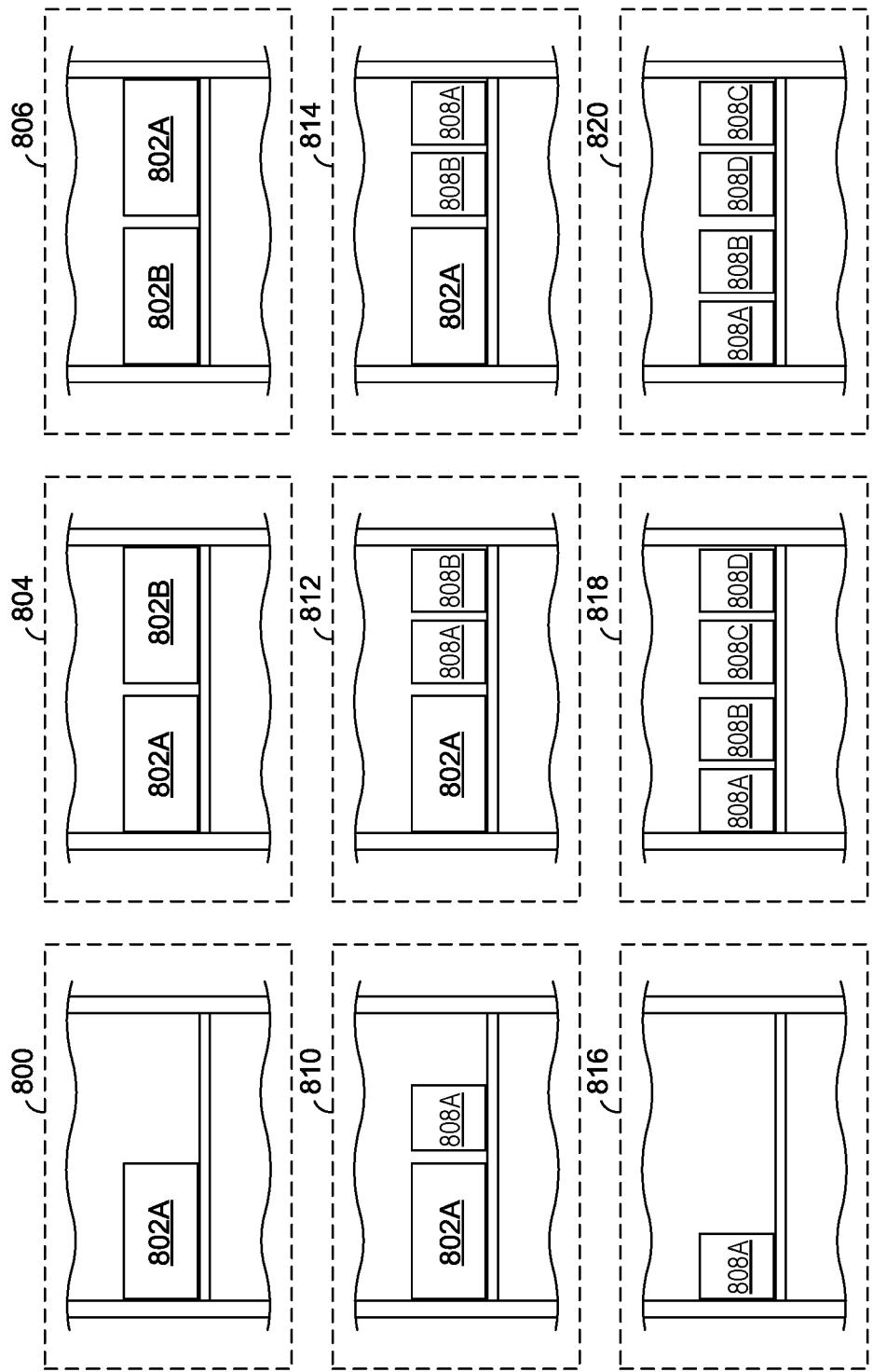
FIG. 8 illustrates several example cartridge location arrangements on a display unit shelf that can be identified using the product display designer of FIG. 2, in accordance with an aspect described herein.

Using a simple example, and with reference to FIG. 8, if a display unit has a shelf that is 12 inches in length, 6 inches wide (the depth), and has a 4-inch space above the shelf where it can hold a cartridge, then the display unit volume is 288 cubic inches. FIG. 8 illustrates a front view of the shelf within each of the dotted boxes. Further, this example also has two selected cartridge types, a first cartridge having a length of 6 inches, a width of 6 inches, and a height of 4 inches, and a second cartridge having a length of 3 inches, a width of 6 inches, and a height of 4 inches. Within FIG. 8, these are respectively illustrated as 6-inch cartridges 802A-B and 3-inch cartridges 808A-D. The 6-inch cartridges 802A-B each have a cartridge volume of 144 cubic inches, while the 3-inch cartridges 808A-D each have a cartridge volume of 72 cubic inches.

Geometric arrangement identifier 214 can identify each arrangement of one cartridge type of the cartridges that maximizes the display unit volume. Continuing this example, FIG. 8 illustrates first arrangement 800 having first 6-inch cartridge 802A positioned on the left side of the shelf, relative to the front-facing view. Geometric arrangement identifier 214 adds second 6-inch cartridge 802B to the right position of the shelf, as illustrated by second arrangement 804. In first arrangement 800, the total cartridge volume of first arrangement 800 is less than the display unit volume; however, the display unit volume occupied by the total cartridge volume of the cartridges is not maximized because second 6-inch cartridge 802B can be included within the arrangement without the total cartridge volume being greater than the display unit volume. Thus, geometric arrangement identifier 214 may identify second arrangement 804 as a geometric arrangement, while first arrangement 800 is not identified as a geometric arrangement. This iterative process continues until all possible geometric arrangements are identified for each cartridge type. As illustrated in FIG. 8, geometric arrangement identifier 214 would identify another arrangement using only 6-inch cartridges 802A-B, shown as third arrangement 806.

Geometric arrangement identifier 214 continues by identifying the geometric arrangements for each combination of cartridges that maximizes the display unit volume. As shown in fourth arrangement 810, first 6-inch cartridge 802A and first 3-inch cartridge 808A are each arranged on the shelf. However, another 3-inch cartridge can be added to the shelf without the total cartridge volume being greater than the display unit volume. Shown in fifth arrangement 812, the shelf includes first 6-inch cartridge 802A, first 3-inch cartridge 808A, and second 3-inch cartridge 808B, which maximizes the display unit volume. As such, fifth arrangement 812 can be identified as a geometric arrangement by geometric arrangement identifier 214. This continues identifying arrangements that maximize the display unit volume using the combination of the cartridge types, such as sixth arrangement 814.

Continuing with the example illustrated by FIG. 8, geometric arrangement identifier 214 identifies all geometric arrangements using only 3-inch cartridges 808A-808D. As illustrated, seventh arrangement 816 includes first 3-inch cartridge 808A. However, more 3-inch cartridge types can be included without the total cartridge volume being greater than the display unit volume. As such, seventh arrangement 816 is not identified as a geometric arrangement of cartridges, while eighth arrangement 818 and ninth arrangement 820 of 3-inch cartridges 808A-808D are identified as geometric arrangements by geometric arrangement identifier 214 because each maximizes the display unit volume.

It will be understood that FIG. 8 provides some example cartridge arrangements. Many possible geometric arrangements of the cartridges have been omitted for clarity.

Using this logic, geometric arrangement identifier 214 can identify geometric arrangements where the arrangement has a total cartridge volume that is less than the display unit volume and the display unit volume occupied by the total cartridge volume is maximized, such that addition of a cartridge volume of another cartridge of any of the identified cartridge types would make the total cartridge volume greater than the display unit volume.

This is just one example logic that would identify the geometric arrangements. It will be understood that other logics may also identify the geometric arrangements of cartridges and the display units. For example, the logic may maximize the use of a single dimension, as opposed to the three-dimensional volumetric maximization logic. Other logics may identify arrangements that are within a predetermined value for the dimension or the volume, such as an arrangement where the cartridge volume exceeds a threshold value or percentage of the display unit volume. For instance, an arrangement can be identified where 70% of the display unit volume is occupied. The threshold value could be any predetermined value. These are intended to be within the scope of the disclosure and may be used in addition to or in place of the example methods described with reference to FIG. 8.

Having identified the geometric arrangements of cartridges held by the display units, geometric arrangement identifier 214 may determine the product arrangements within the display units based on the geometric arrangement of cartridges.

One method for determining product arrangements is to associate each cartridge of a geometric arrangement of cartridges with one product type. This can be done for each product type within target mix ratio 203. That is, each product type of target mix ratio 203 is represented by association to at least one cartridge. Where all product types are represented by at least one cartridge in the geometric arrangements of cartridges, the geometric arrangement can remain a geometric arrangement for use by other functions of product display design model 210. Geometric arrangements of cartridges that do not have at least one cartridge for each product type may be excluded from the geometric arrangements. For instance, if there are four cartridges arranged in a display unit and the target mix ratio includes a mix of five product types, then this arrangement may be excluded, as there are fewer cartridges than product types. Additionally, a product type can be associated with more than one cartridge. For example, if there are three product types and four cartridges in a display unit, then two cartridges will have the same product type, while the other two cartridges will have one of each of the two remaining product types.

Determining the product arrangements for each of the geometric arrangements expands the total number of geometric arrangements. This is because some geometric arrangements of cartridges with display units can have more than one product arrangement.

The geometric arrangements, including the expanded geometric arrangements based on the determining the product arrangements can be included as part of a set of product display design options. For example, each product display design option is associated with a geometric arrangement of cartridges within one or more display units, and includes a product arrangement where each of the cartridges is associated with a product type. The product display design options can be utilized by other functions of product display design model 210, such as product display design option specification determiner 216.

In general, product display design option specification determiner 216 determines actual product display information for product display design options. As noted, product display design options comprise display units having cartridge arrangements, where each cartridge is associated with a product type. Based on this, product display design option specification determiner 216 can determine the product information related to the actual total product count and the actual mix ratio for each of the product display design options.

To determine the actual product count, product display design option specification determiner 216 determines the total number of products held by the cartridges of a product display design option. One method of determining the product count is to identify the cartridge type and the associated product type for each cartridge in the product display design option. For each cartridge, the cartridge volume for the cartridge and the product volume for the product associated with the cartridge can be both retrieved from product display dataset 222. The total number of products for the cartridge is the number of products that maximize the cartridge volume holding the products without the total product volume exceeding the cartridge volume. The actual total product count will then be the summation of the number of products within each cartridge of the product display design option.

In another implementation, the fill amount threshold can be determined for a cartridge, which describes how much volume of the cartridge is filled by the products. For instance, the fill amount threshold for the cartridge can be any predetermined value; however, in one specific aspect, it is any value equal to or between 50% and 100% filled. Using this method, the number of products for each cartridge is the number of products that comprises a total product volume substantially equal to the fill amount threshold. As an example, if a cartridge has a fill amount threshold of 50%, then the number of products for the cartridge can be determined where the total product volume of the products is substantially equal to 50% of the cartridge volume. Similarly, the actual total product count will be the summation of the number of products within each cartridge of the product display design option.

Another method for determining the actual total product count includes retrieving product count information associated with a cartridge type, which can be stored in product display dataset 222. For instance, a stacking arrangement for each product type can be determined for each cartridge type, which provides the number of products of a particular product type that can be held by a cartridge of a particular cartridge type. As such, product display design option specification determiner 216 can identify each cartridge and its associated product type for a product display design option. Using this, product display design option specification determiner 216 retrieves from product display dataset 222 the product count for each cartridge based on the predetermined product count for the product type associated with the cartridge type. The actual total product count for the product display design option is then the summation of the product count for each cartridge.

Product display design option specification determiner 216 can also determine an actual mix ratio for the product display design options. The actual mix ratio indicates the proportion of each product type of the products relative to an actual total product count. The number of products for each product type within the product display design option can be determined using the methods just described. The actual mix ratio then is the amount of each product type in proportion to the actual total product count. For example, if the total product count is 100 and the actual product count for a first product type is 20, a second product type is 30, and a third product type is 50, then the actual mix ratio is 20% of the first product type, 30% of the second product type, and 50% of the third product type.

Product display design option selector 218 generally utilizes the actual product display information determined by product display design option specification determiner 216 to select a product display design option for output by product display design model 210, such as product display design option 208.

Product display design option specification determiner 216 may select a product display design option based on the actual total product count, the actual mix ratio, or both. The selected product display design option can be the product display design option having an actual total product count or an actual mix ratio that is closest to target total product count 205 or target mix ratio 203 received as inputs 202.

To determine the product display design option having an actual total product count that is the closest to target total product count 205, product display design option selector 218 can determine the absolute value of the difference between the actual total product count and target total product count 205. Using this example method, the product display design option having the lowest calculated value is closest.

To determine the product display design option having an actual mix ratio that is the closest to target mix ratio 203, a minimum average difference can be determined and used. To determine the lowest average difference, the product count for each product type of the product display design option is determined using methods previously discussed. The target mix ratio indicates the proportional amount of each product type based on the target total product count. The absolute value of the difference between the product count for each product type of the product display design option and the product count determined from the target mix ratio and the target total product count can be determined. The difference between the product counts is averaged. The product display design option associated with the lowest average difference is the closest. Another similar method determines the lowest average difference between the proportional value (e.g., the percentage) of each product type of the product display design option and the proportional value of each product type based on the target mix ratio.

When determining the lowest average distance for products types between the actual values and the target values, product types can be weighted to emphasize particular product types. That is, some product types can be weighted more heavily than other product types, such that the more heavily weighted product types more greatly affects the lowest average difference. This may be done so that product types having a greater proportion of representation within the target mix ratio have a greater effect in determining the lowest average difference.

In an implementation, product display design option selector 218 ranks the product display design options based on the target total product count compared to the actual total product count. The ranking may further be based on the target mix ratio compared to the actual mix ratio. Higher ranked product display design options have actual values that are closer to the target values. Product display design option selector 218 can select a highest ranked product display design option. This implementation can also be beneficial when selecting multiple product display design options for output by the product display designer, such as the top two or three ranked product display design options. Although, it will be recognized that any top number can be selected. Using this method also allows multiple product display design option outputs to be presented to a client or other entity.

In another implementation, product display design option selector 218 selects more than one product display design option based on different target values determined for different locations. For instance, the target total product count and target mix ratio may be associated with a first location. An additional target total product count and additional target mix ratio can be determined for a second location that is different that the first. In practice, this often occurs where retailers are regional and different ratios and different product types are generally sold. To account for this, product display design option selector 218 may select a first product display design option based on its actual total product count compared to a first target total product count of the first location or its actual mix ratio compared to a first target mix ratio of the first location. Product display design option selector 218 may also select a second product display design option based on its actual total product count compared to a second target total product count of the second location or its actual mix ratio compared to a second target mix ratio of the second location.

It should be recognized that these are example methods for determining the product display design option having actual values that are closest to the target values. Other statistical methods can be performed by product display design option selector 218 to determine which product display design option has actual values closest to target values relative to other product display design options that have been determined by product display design model 210. Some examples suitable for use include a t-test, a goodness-of-fit test, and the like.

In some cases, multiple product display design options can have the same "closeness" to the target values. That is, the method used to determine the closest product display design option to the target values determines more than one product display design option that are each equally as close to the target values. This can occur where the two different product display design options have the same actual total product count and the same actual mix ratio. Here, each product display design option includes the same cartridge types associated with the same product types; however, the cartridges are in different arrangements within the product display. In such cases, product display design option selector 218 may select the closest product display design option that maximizes the distance between products of the same type. Put another way, product display design option selector may select the product display design option that separates two cartridges associated with the same product type using another cartridge associated with a different product type. This will create a product display that spreads out products of the same type over the product display when they are presented, which is generally more appealing than grouping all products of the same product type together. Additionally, this is beneficial because it helps to evenly distribute the weight across the product display, as some product type compositions are denser than others.

In stand-alone type product displays, product display design option selector 218 may select the closest product display design that has the heaviest product types arranged lower in the product display than relatively lighter product types, which are arranged higher in the product display compared to the heavier product types. This gives stand-alone type displays a lower center of gravity, making them less likely to topple.

In other aspects, product display design option selector 218 can be configured for selecting a product display design option based on other factors. For example, product display design option selector 218 may select the product display design option based on total profit margin of the products within the corresponding product display, based on total cost of the product display, based on the number of display units within the product display, based on the total material forming the product display, and the like.

In another implementation, the product display design option is manually selected by, for example, a client or other entity involved in the design, manufacture, or use of product displays.

The selected product display design option can be provided by product display design model 210 as an output, such as product display design option 208. The output can be in the form of a three-dimensional or two-dimensional visual representation. The selected product display design option can be provided as a three-dimensional reconstruction illustrating the product display associated with the selected product display design option, including the cartridge location arrangement for each of the display units. The product display output may include additional features, such as a top, base or other feature, based on a product display type, such as product display type 206 received as part of inputs 202. In another example, the output can be provided as a two-dimensional grid that represents the cartridge location arrangement and the product type associated with each cartridge of product display design. In aspects where more than one display unit is included in the selected product display design option, the output can provide a location for one of the displays relative to the other display based on the product display type, such as product display type 206. Another output may simply be a set of computer-executable or human-readable instructions suitable for forming the corresponding product display.

The product display design option 208 can further be provided to a manufacturer or a manufacturing device to manufacture the associated product display. Blanks for each of the cartridge, display units, and other features can be formed using the manufacturing device based on the product display design option 208. The blanks can be constructed into their respective cartridges, display units, and other features. These can be assembled in accordance with the product display design option 208 to provide the constructed product display.

Figure 9:
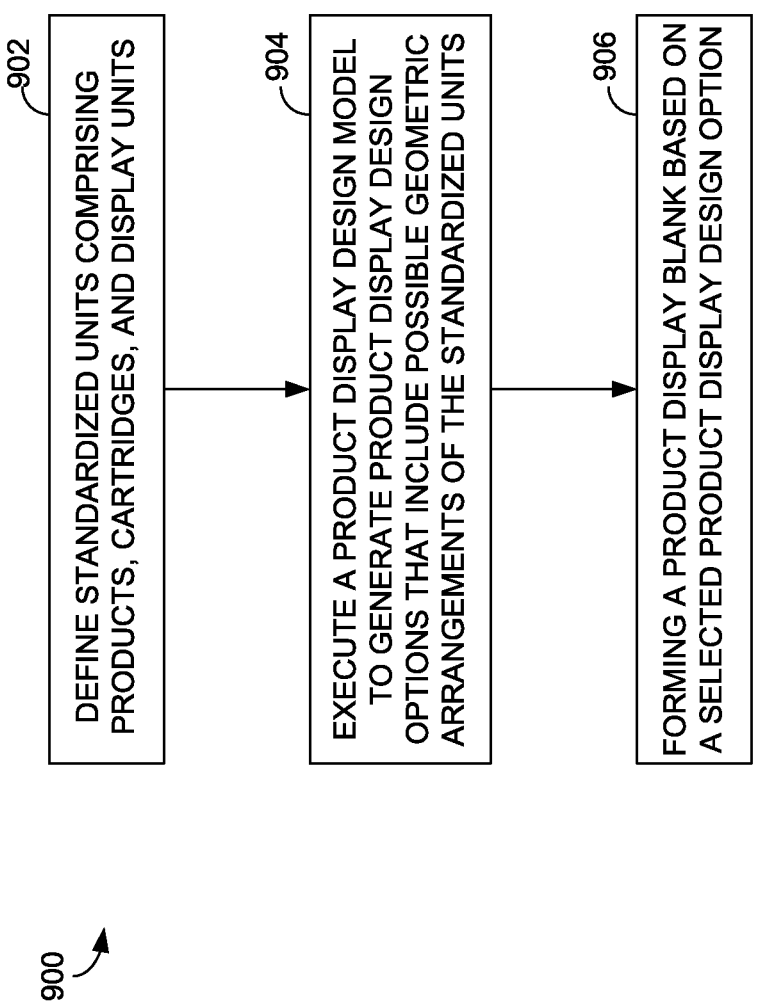
FIG. 9 is a flow diagram of an example method for manufacturing a product display designed using a product display design model, in accordance with an aspect described herein.

Turning now to FIG. 9, a flow diagram of example method 900 for manufacturing a product display is provided. At block 902, standardized units comprising products, cartridges, and display units are defined. As previously discussed, product types associated with the products can each be defined in terms of their volume parameters, which indicate the product volume for each product type. Products can also be defined based on their composition. Cartridge types associated with the cartridges can each be defined in terms of their volume parameters, which indicate the cartridge volume for each cartridge type. Each cartridge type can be associated with one or more display units configured to hold a cartridge of the cartridge type. Display unit types associated with each of the display units can be defined in terms of their volume parameters, which indicate the volume of the display unit configured to hold a cartridge. The display units can further be associated with product display types. The defined standardized units and other related information may be stored in computer memory.

At block 904, a product display design model is executed to generate product display design options that include geometric arrangements of the standardized units. The product display design model identifies geometric arrangements of the standardized units, including one or more of the products, the cartridges, and the display units. In this way, the number of product display design options is limited to a finite number based on the specific volume of space that defines each of the standardized units. Each geometric arrangement includes a product volume spatially oriented within a cartridge volume and the cartridge volume spatially oriented within a display unit volume. Put another way, each geometric arrangement specifies a product spatially oriented within a cartridge and the cartridge spatially oriented within a display unit.

At block 906, a display unit blank is formed based on a selected product display design option. The selected product display design option is selected from the generated product display design options. The selection may be based on an actual total product count value for each product display design option compared to a target total product count. The selection may also be based on an actual mix ratio for each of the product display design options compared to a target mix ratio. The selected product display design option incudes a geometric arrangement of display units, cartridges, and products.

The display unit blanks can be formed using a manufacturing device, and the display unit blanks are configured to construct display units. The cartridge blanks can be formed using the manufacturing device, and the cartridge blanks are configured to construct cartridges. The product display can be assembled from the display units and the cartridges based on the geometric arrangement provided by the product display design option, which indicates a cartridge location arrangement for each cartridge within the display units based on the product type associated with each cartridge, and indicates a location for each of the display units within the product display.

With reference now to FIG. 10, another flow diagram of example method 1000 for manufacturing a product display is provided. At block 1002, a product display type and a target total product count are provided. The product display type may be provided by selecting a product display type from a plurality of product display types that have been designed. The product display type may also be provided by creating and defining a new product display type. The target total product count can be received at a computing device associated with any entity that designs, manufactures, requests or uses a product display. The target total product count can be received from the computing device for use by a product display design model.

At block 1004, the product display design model is executed to generate product display design options that include geometric arrangements of the standardized units. Each product display design option is generated from the product display design model by identifying a geometric arrangement of standardized units that comprise products, cartridges, and a display unit. The display unit can be determined based on the product display type and the cartridges can be associated with one or more cartridge types determined based on the display unit. Each geometric arrangement specifies a product spatially oriented within a cartridge and the cartridge spatially oriented within a display unit.

At block 1006, a product display design option is selected. The selected product display design option can be selected based on a comparison of an actual total product count with the target total product count.

At block 1008, a display unit blank is formed based on the selected product display design option. Cartridge blanks may also be formed based on the selected product display design option. The selected product display design option provides the structural features of the display unit based on association with the display unit type and a number of display units, which are used by a manufacturing device to form one or more display unit blanks for one or more display unit types. The selected product display design option also provides the structural features of the cartridges associated with the cartridge types and the number of cartridges, which are used by the manufacturing device to form one or more cartridge blanks for one or more cartridge types. The manufactured display unit blanks and cartridge blanks can be constructed in respective display units and cartridges, and assembled into the product display. The product display can have a cartridge location arrangement based on the product type associated with each cartridge and the geometric arrangement associated with the product display design option.

Regarding FIG. 11, a flow diagram is provided illustrating an example method 1100 for designing a product display. Each block of method 1100 comprises a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. Method 1100 could be implemented by product display designer 200 as described in conjunction with FIG. 2.

With continued reference to FIG. 11, example method 1100 for designing a product display is provided. At block 1102, volume parameters for standardized units comprising products, cartridges, and display units are received. The volume parameters for the standardized units can be defined and stored in computer memory. The volume parameters can be received by retrieving the volume parameters from the computer memory. Display units are configured to hold cartridges and the cartridges are configured to hold the products. In a specific case, each cartridge holds products of one product type. Each of the standardized units is defined by a specific volume of space, i.e., each product of a product type occupies a product volume, each cartridge of a cartridge type occupies a cartridge volume, and the volume of space within a display unit configured to hold a cartridge defines a display unit volume.

At block 1104, a request to design a product display is received. The request can include various inputs for designing the product display, including any combination of target total product count, product types, target mix ratio, and product display type.

At block 1106, product display design options are generated by identifying geometric arrangements of the standardized units. Each product display design option is associated with a geometric arrangement. Each geometric arrangement comprises a product volume spatially oriented within a cartridge volume, and the cartridge volume spatially oriented within a display unit volume. Thus, each geometric arrangement specifies a product spatially oriented within a cartridge, and the cartridge spatially oriented within a display unit. In this way, the geometric arrangements are identified based on the specific volume of the standardized units.

At block 1108, a generated product display design option is provided for manufacturing a corresponding product display. The product display design option can be provided as a visual representation or a machine-readable or human-readable representation of the product display. The product display may be manufactured by a manufacturing device in accordance with the generated product display design option.

Each of the product display design options may be ranked. The ranking can be based on a target total product count or a target mix ratio compared to an actual total product count or an actual mix ratio associated with each product display design option. The generated product display design option can be provided for manufacture based on the ranking.

In some cases, a plurality of product display design options is provided for manufacturing, including a first and second product display design option. The first and second product display design option can each be selected based on the ranking. In another aspect, the first product display design option is selected based on target values associated with a first location compared to actual values for the first product display design option. The second product display design option is selected based on target values associated with a second location compared to actual values for the second product design option.

Having described an overview of embodiments of the present technology, an example operating environment in which embodiments of the present invention may be implemented is described below in order to provide a general context for various aspects of the technology. Referring now to FIG. 12 in particular, an example operating environment for implementing embodiments of the technology is shown and designated generally as computing device 1200. Computing device 1200 is but one example of a suitable computing environment and is not intended to suggest any limitation as to the scope of use or functionality of the technology. Neither should computing device 1200 be interpreted as having any dependency or requirement relating to any one or combination of components illustrated.

Some aspects of the technology are described in the general context of computer code or machine-useable instructions, including computer-executable instructions such as program modules, being executed by a computer or other machine, such as a cellular telephone, personal data assistant, or other handheld device. Generally, program modules including routines, programs, objects, components, data structures, etc., refer to code that perform particular tasks or implement particular abstract data types. The disclosed technology may be practiced in a variety of system configurations, including hand-held devices, consumer electronics, general-purpose computers, more specialty computing devices, and the like. The disclosed technology may also be practiced in distributed computing environments where tasks are performed by remote-processing devices that are linked through a communications network.

With continued reference to FIG. 12, computing device 1200 includes bus 1210 that directly or indirectly couples the following devices: memory 1212, one or more processors 1214, one or more presentation component(s) 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 12 is merely illustrative of an example computing device that can be used in connection with one or more embodiments of the technology. Distinction is not made between such categories as "workstation," "server," "laptop," "hand-held device," as so on, as all are contemplated within the scope of FIG. 12 in referring to "computing device."

Computing device 1200 typically includes a variety of computer-readable media. Computer-readable media can be any available media that can be accessed by computing device 1200. It includes both volatile and nonvolatile media, and removable and non-removable media. By way of example, computer-readable media may comprise computer storage media and communication media. Computer storage media includes both volatile and nonvolatile, removable and non-removable media, which may be implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and that can be accessed by computing device 1200. Computer storage media does not comprise signals per se. Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared, and other wireless media. Combinations of any of the above should also be included within the scope of computer-readable media.

Memory 1212 includes computer storage media in the form of volatile or nonvolatile memory. Memory 1212 may be removable, non-removable, or a combination thereof. Example hardware devices include solid-state memory, hard drives, optical-disc drives, and so forth. Memory 1212 may comprise computer-readable instructions, such as instructions 1224. Computing device 1200 includes one or more processors 1214 that read data from various entities such as memory 1212 or I/O components 1220. For example, one or more processors 1214 may read and execute instructions 1224 stored on memory 1212, the execution of which is represented by the dashed lines of instructions 1224 within one or more processors 1214. Presentation component(s) 1216 present data indications to a user or other device. Example presentation components include a display device, speaker, printing component, vibrating component, and the like.

I/O ports 1218 allow computing device 1200 to be logically coupled to other devices including I/O components 1220, some of which may be built in. Illustrative components include a microphone, joystick, game pad, satellite dish, scanner, printer, wireless device, etc. I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1200.

Computing device 1200 may be equipped with depth cameras, such as stereoscopic camera systems, infrared camera systems, RGB camera systems, touchscreen technology, and any combination of these, for gesture detection and recognition. Additionally, computing device 1200 may be equipped with accelerometers or gyroscopes that enable detection of motion. The output of the accelerometers or gyroscopes may be provided to the display of computing device 1200 to render immersive augmented reality or virtual reality.

Embodiments described herein support designing and manufacturing product displays. Some of the components described herein refer to integrated components associated with a computer executing product display designer. The integrated components refer to the hardware architecture and software framework that support functionality of the product display designer. The hardware architecture refers to physical components and interrelationships thereof and the software framework refers to software providing functionality that can be implemented with hardware embodied on a device, such any of the components described in conjunction with FIG. 1.

The end-to-end software-based product display designer can operate computer hardware to provide functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the product display designer can manage resources and provide services for the product display designer functionality. Any other variations and combinations are contemplated with embodiments of the present disclosure.

Having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some additional aspects of the technology that can be implemented based on the foregoing description follow.

Aspect 1: One or more computer storage media having computer-useable instructions that, when used by a computing device, cause the computing device to design a product display by performing operations comprising: receiving volume parameters for standardized units, the standardized units comprising products, cartridges configured to hold the products, and display units configured to hold the cartridges, the geometric configurations defining a specific volume of space for each of the standardized units comprising a product volume, a cartridge volume, and a display unit volume; receiving a request to design a product display, the request comprising a product display type and a product type associated with the products; generating product display design options by identifying geometric arrangements of a product selected based on the received product type, a cartridge, and a display unit selected based on the received product display type, wherein the geometric arrangements are limited to a finite number based on the specific volume of space defining each of the standardized units, and wherein each of the geometric arrangements specifies the product spatially oriented within the cartridge, and the cartridge spatially oriented within the display unit; and providing a generated product display design option for manufacturing, wherein the product display is manufactured in accordance with the generated product display design option.

Aspect 2: The media of aspect 1, wherein the request further comprises a target total product count, and wherein generating the product display design options further comprises selecting a number of display units of the display unit type based on the target total product count.

Aspect 3: The media of aspect 2, wherein the request further includes a target mix ratio that indicates a proportion of the product type relative to the target total product count, wherein the generated product display design option is provided based on the target mix ratio compared to an actual mix ratio of the generated product display design option.

Aspect 4: The media of aspect 1, further comprising receiving a selection of the generated product display option provided for manufacturing, the generated product display option selected based on a ranking of the generated product display design options, the ranking determined based on a target total product count included in the request compared to an actual total product count associated with each of the generated product display options.

Aspect 5: The media of aspect 1, further comprising providing an additional generated product display option for manufacturing, the generated product display option and the additional generated product display option selected from the generated product display options based on an actual mix ratio of the generated product display option compared to a first target mix ratio associated with a first location and an additional actual mix ratio of the additional generated product display option compared to a second target mix ratio associated with a second location.

Aspect 6: The media of aspect 1, wherein identifying the geometric arrangements includes: arranging the cartridges within the display unit by iterating through each cartridge type of the cartridges to identify combinations of the cartridges that maximize the display unit volume; arranging the products within the combinations of the cartridges by associating each of the cartridges with one product type; and identifying as the geometric arrangements the combinations of cartridges that each include at least one cartridge for each product type received in the request.

Aspect 7: The media of aspect 1, further comprising providing instructions to a manufacturing device, wherein the manufacturing device manufactures a display unit blank configured to construct the display unit of the product display and a cartridge blank configured to construct the cartridge of the product display based on the instructions.

Aspect 8: A computerized method for designing a product display, the method comprising: receiving a selection of product types associated with products, a product display type associated with a display unit configured to hold cartridges, a target total product count, and a target mix ratio that indicates a proportion of each product type relative to the target total product count, wherein the products, the cartridges, and the display unit are part of standardized units that are each defined by a specific volume of space comprising a product volume, a cartridge volume, and a display unit volume; generating product display design options by identifying geometric arrangements of the products and the cartridges within the display unit, wherein the geometric arrangements are limited to a finite number based on the specific volume of space defining each of the standardized units; determining an actual total product count and an actual mix ratio for each of the generated product display design options, the actual mix ratio indicating a proportion of each product type relative to the actual total product count; and providing a generated product display design option for manufacturing based on the target total product count compared to the actual total product count and the target mix ratio compared to the actual mix ratio, wherein the product display is manufactured in accordance with the generated product display design option.

Aspect 9: The method of aspect 8, wherein the product display comprises a plurality of display units determined based on the target total product count.

Aspect 10: The method of aspect 8, further comprising generating a visual indication of a location of the products within the product display, the location within the display determined by product type.

Aspect 11: The method of aspect 10, wherein determining the location within the display comprises separating cartridges of a same product type by a cartridge of a different product type.

Aspect 12: The method of aspect 8, wherein identifying the geometric arrangements includes: arranging the cartridges within the display unit by iterating through each cartridge type of the cartridges to identify combinations of the cartridges that maximize the display unit volume; arranging the products within the combinations of the cartridges by associating each of the cartridges with one product type; and identifying as the geometric arrangements the combinations of cartridges that each include at least one cartridge for each product type received.

Aspect 13: The method of aspect 8, wherein the cartridges comprise a first cartridge type and a second cartridge type each having a specific cartridge volume, the specific cartridge volume of second cartridge type being one-half the specific cartridge volume of the first cartridge type.

Aspect 14: The method of aspect 8, further comprising providing instructions to a manufacturing device, wherein the manufacturing device manufactures a display unit blank configured to construct the display unit of the product display and a cartridge blank configured to construct a cartridge of the product display based on the instructions.

Aspect 15: A system for designing a product display, the system comprising: at least one computer processor; and one or more computer storage media having stored thereon computer-readable instructions for designing a product display that, when executed, cause the at least one processor to perform operations comprising: receiving a product display type and a target total product count of products for display in a product display associated with the product display type; generating product display design options by identifying geometric arrangements of standardized units comprising products, cartridges, and a display unit, the display unit determined based on the product type and the cartridge determined based on the display unit, each of the standardized units defined by a specific volume of space comprising a product volume, a cartridge volume, and a display unit volume, wherein the geometric arrangements are limited to a finite number based on the specific volume of space, and wherein each of the geometric arrangements specifies a product spatially oriented within a cartridge and the cartridge spatially oriented within the display unit; determining an actual total product count for each of the generated product display design options; and providing a generated product display design option for manufacturing the product display, the generated product display design option being selected for manufacture based on the actual total product count for the generated product display design compared to the target total product count.

Aspect 16: The system of aspect 15, further comprising a manufacturing device, wherein the generated product display design option is provided to the manufacturing device, and the manufacturing device manufactures a display unit blank and a cartridge blank for the product display based on the generated product display design option.

Aspect 17: The system of aspect 15, further comprising: receiving a target mix ratio that indicates a proportion of each product type of the products relative to the target total product count; and determining an actual mix ratio for each of the generated product display design options, wherein the generated product display design provided for manufacture is further selected based on the actual mix ratio compared to the target mix ratio.

Aspect 18: The system of aspect 15, wherein a selection of product types associated with the products is received, and wherein identifying the geometric arrangements includes: arranging the cartridges within the display unit by iterating through each cartridge type of the cartridges to identify combinations of the cartridges that maximize the display unit volume; arranging the products within the combinations of the cartridges based on product type; and identifying as the geometric arrangements the combinations of cartridges that each include at least one cartridge for each product type.

Aspect 19: The system of aspect 15, further comprising defining the standardized units such that each product type of the products has a specific product volume, each cartridge type of the cartridges has a specific cartridge volume, and the display unit volume is specific to the display unit type.

Aspect 20: The system of aspect 15, further comprising generating a visual indication of a location of the products within the product display, the location within the display determined by product type.

What is claimed is:

1. A computer-implemented method performed by one or more processors, the method comprising:
receiving inputs for a product display type selected from a plurality of product display types, receiving inputs for a target total product count comprising a target total number of products, of all product types, in a product display corresponding to the product display type, and receiving inputs for a target mix ratio indicating a proportion of the product types relative to the target total product count;
executing a product display design model to generate product display design options by identifying geometric arrangements of standardized units that comprise the products, cartridges, and a display unit corresponding to the product display type, wherein the geometric arrangements specify a product spatially oriented within a cartridge and the cartridge spatially oriented within the display unit, and wherein display units are configured to be modularly arranged in a display unit group to form the product display;

selecting a product display design option from among generated product display design options based on a closeness of a total product count to the target total product count and based on a closeness of an actual mix ratio to the target mix ratio; and providing a selected product display design option for manufacturing the display unit of the product display.

2. The method of claim 1, wherein the product display comprises a recessed area having a volume substantially equal to a cartridge volume of the cartridge.

3. The method of claim 1, wherein the standardized units for which the geometric arrangements are identified comprise a plurality of display units of a display unit type determined based on the selected product display type and the target total product count, wherein the plurality of display units modularly arranges into the product display.

4. The method of claim 1, further comprising defining the standardized units such that each product type of the products has a specific product volume, each cartridge type of the cartridges has a specific cartridge volume, and a display unit volume is specific to a display unit type corresponding to the product display type.

5. The method of claim 4, wherein the cartridges comprise a first cartridge type and a second cartridge type, the specific cartridge volume of the second cartridge type being one-half the specific cartridge volume of the first cartridge type.

6. The method of claim 1, wherein the selected product display design option is selected from a highest ranked product display design option of the generated product display design options.

7. The method of claim 1, further comprising:
identifying cartridge location arrangements for the cartridges within the display units;
identifying a product type associated with the products for each of the cartridges within the display units; and
providing a visual representation of a cartridge location arrangement associated with the selected product display design option, the visual representation indicating a location for each product type within the display unit of the product display.

8. One or more computer storage media storing computer-readable instructions that, when executed by a processor, cause the processor to perform a method comprising:
receiving inputs for a product display type selected from a plurality of product display types, receiving inputs for a target total product count comprising a target total number of products, of all product types, in a product display corresponding to the product display type, and receiving inputs for a target mix ratio indicating a proportion of the product types relative to the target total product count;
executing a product display design model to generate product display design options by identifying geometric arrangements of standardized units that comprise the products, cartridges, and a display unit corresponding to the product display type, wherein the geometric arrangements specify a product spatially oriented within a cartridge and the cartridge spatially oriented within the display unit, and wherein display units are configured to be modularly arranged in a display unit group to form the product display;
selecting a product display design option from among generated product display design options based on a closeness of a total product count to the target total product count and based on a closeness of an actual mix ratio to the target mix ratio; and
providing a selected product display design option for manufacturing the display unit of the product display.

9. The media of claim 8, wherein the product display comprises a recessed area having a volume substantially equal to a cartridge volume of the cartridge.

10. The media of claim 8, wherein the cartridge comprises volume parameters, and at least one of the volume parameters of the cartridge is a division of a corresponding volume parameter of a recessed area within the display unit.

11. The media of claim 8, wherein a display unit volume is the same for display units of a same type of a plurality of display unit types.

12. The media of claim 8, wherein a display unit volume of the display unit is divisible by a cartridge volume of the cartridge.

13. The media of claim 8, further comprising defining the standardized units such that each product type of the products has a specific product volume, each cartridge type of the cartridges has a specific cartridge volume, and a display unit volume is specific to a display unit type corresponding to the product display type.

14. The media of claim 13, further comprising providing the defined standardized units to the product display design model for use in determining the geometric arrangements.

15. The media of claim 13, wherein the cartridges comprise a first cartridge type and a second cartridge type, the specific cartridge volume of the second cartridge type being one-half the specific cartridge volume of the first cartridge type.

16. The media of claim 8, further comprising:
identifying cartridge location arrangements for the cartridges within the display unit;
identifying a product type associated with the products for each of the cartridges within the display unit; and
providing a visual representation of a cartridge location arrangement associated with the selected product display design option, the visual representation indicating a location for each product type within the display unit of the product display.

17. A system comprising:
at least one processor; and
one or more computer storage media storing computer readable instructions thereon that, when executed by the at least one processor, cause the at least one processor to perform a method comprising:
receiving inputs for a product display type selected from a plurality of product display types, receiving inputs for a target total product count comprising a target total number of products, of all product types, in a product display corresponding to the product display type, and receiving inputs for a target mix ratio indicating a proportion of the product types relative to the target total product count;
executing a product display design model to generate product display design options by identifying geometric arrangements of standardized units that comprise the products, cartridges, and a display unit corresponding to the product display type, wherein the geometric arrangements specify a product spatially oriented within a cartridge and the cartridge spatially oriented within the display unit, and wherein display units are configured to be modularly arranged in a display unit group to form the product display;
selecting a product display design option from among generated product display design options based on a closeness of a total product count to the target total product count and based on a closeness of an actual mix ratio to the target mix ratio; and providing a selected product display design option for manufacturing the display unit of the product display.

18. The system of claim 17, further comprising defining the standardized units such that each product type of the products has a specific product volume, each cartridge type of the cartridges has a specific cartridge volume, and a display unit volume is specific to a display unit type corresponding to the product display type.

19. The system of claim 18, further comprising providing the defined standardized units to the product display design model for use in determining the geometric arrangements.

20. The system of claim 18, wherein the cartridges comprise a first cartridge type and a second cartridge type, the specific cartridge volume of the second cartridge type being one-half the specific cartridge volume of the first cartridge type.

* * * * *